(12) United States Patent
Kim

(10) Patent No.: US 8,662,713 B2
(45) Date of Patent: Mar. 4, 2014

(54) LENS AND LIGHTING DEVICE INCLUDING THE SAME

(75) Inventor: Eunhwa Kim, Seoul (KR)

(73) Assignee: LG Innotek Co., Ltd, Seoul (KR)

( * ) Notice: Subject to any disclaimer, the term of this patent is extended or adjusted under 35 U.S.C. 154(b) by 138 days.

(21) Appl. No.: 13/080,459

(22) Filed: Apr. 5, 2011

(65) Prior Publication Data

US 2011/0205744 A1 Aug. 25, 2011

(30) Foreign Application Priority Data

Apr. 9, 2010 (KR) .................... 10-2010-0032959

(51) Int. Cl.
*F21V 3/00* (2006.01)

(52) U.S. Cl.
USPC .................. 362/311.02; 362/309; 362/311.09

(58) Field of Classification Search
USPC ............... 362/268, 296.01, 297, 309, 311.02, 362/338, 235, 97.1–97.3, 240, 244, 245, 362/308, 31.01, 311.09, 311.1, 327, 362/334–336, 340, 800; 359/619, 642, 718, 359/719, 811, 819; 313/498–500, 512; 257/98–100, E33.059, E33.068, 257/E33.073

See application file for complete search history.

(56) References Cited

U.S. PATENT DOCUMENTS

| | | | | |
|---|---|---|---|---|
| 2,215,900 A | * | 9/1940 | Bitner | 362/309 |
| 2,254,962 A | * | 9/1941 | Bitner et al. | 362/327 |
| 5,805,355 A | * | 9/1998 | Natsuno | 359/719 |
| 6,114,688 A | * | 9/2000 | Tanaka et al. | 250/216 |
| 7,182,481 B2 | * | 2/2007 | Shimura | 362/244 |
| 7,445,359 B2 | * | 11/2008 | Chang | 362/331 |
| 7,461,960 B2 | * | 12/2008 | Opolka et al. | 362/545 |
| 7,473,013 B2 | * | 1/2009 | Shimada | 362/327 |
| 7,474,474 B2 | * | 1/2009 | Angelini et al. | 359/708 |
| 7,489,456 B2 | * | 2/2009 | Yang et al. | 359/819 |
| 7,674,019 B2 | * | 3/2010 | Parkyn et al. | 362/334 |
| 7,762,701 B2 | * | 7/2010 | Luo et al. | 362/545 |
| 7,880,188 B2 | * | 2/2011 | Blumel et al. | 257/98 |
| 7,934,858 B2 | * | 5/2011 | Nakamura | 362/311.09 |
| 7,976,194 B2 | * | 7/2011 | Wilcox et al. | 362/268 |
| 8,007,150 B2 | * | 8/2011 | Yagi | 362/520 |
| 8,220,958 B2 | * | 7/2012 | Montagne | 362/235 |
| 8,231,248 B2 | * | 7/2012 | Fu et al. | 362/311.02 |
| 8,449,150 B2 | * | 5/2013 | Allen et al. | 362/311.06 |
| 2002/0080615 A1 | * | 6/2002 | Marshall et al. | 362/333 |
| 2007/0070530 A1 | * | 3/2007 | Seo et al. | 359/819 |
| 2008/0316734 A1 | * | 12/2008 | Spartano et al. | 362/105 |
| 2009/0003009 A1 | * | 1/2009 | Tessnow et al. | 362/487 |
| 2009/0279296 A1 | * | 11/2009 | Chang | 362/235 |
| 2010/0165635 A1 | * | 7/2010 | Chen et al. | 362/307 |

(Continued)

FOREIGN PATENT DOCUMENTS

| | | | |
|---|---|---|---|
| JP | 05088062 A | * | 4/1993 |
| JP | 2005-109289 | | 4/2005 |
| JP | 2007142178 A | * | 6/2007 |
| JP | 2009152142 A | * | 7/2009 |

(Continued)

*Primary Examiner* — Hargobind S Sawhney
(74) *Attorney, Agent, or Firm* — Lowe Hauptman & Ham, LLP

(57) ABSTRACT

Disclosed is a lens including a light emitting surface. The light emitting surface of the lens according to the embodiment of the present invention has a coordinate obtained by subtracting a Bezier coordinate corresponding to an aspheric coordinate from the aspheric coordinate.

16 Claims, 21 Drawing Sheets

(56) References Cited

U.S. PATENT DOCUMENTS

| | | | |
|---|---|---|---|
| 2010/0238669 A1* | 9/2010 | Holder et al. | 362/311.02 |
| 2011/0080725 A1* | 4/2011 | Brands et al. | 362/187 |
| 2011/0080736 A1* | 4/2011 | Brands et al. | 362/277 |
| 2011/0116272 A1* | 5/2011 | Bak et al. | 362/296.01 |
| 2011/0164426 A1* | 7/2011 | Lee | 362/335 |
| 2011/0188252 A1* | 8/2011 | Lin | 362/294 |
| 2011/0242808 A1* | 10/2011 | Wang | 362/235 |

FOREIGN PATENT DOCUMENTS

| | | |
|---|---|---|
| KR | 10200900226671 | 3/2003 |
| KR | 1020060074937 | 7/2006 |
| KR | 1020060120810 | 11/2006 |
| KR | 1020070021874 | 2/2007 |
| KR | 1020070107261 | 11/2007 |

* cited by examiner

LENS AND LIGHTING DEVICE INCLUDING THE SAME

The present application claims priority under 35 U.S.C. §119(e) of Korean Patent Application No 10-2010-0032959 filed on Apr. 9, 2010, which is hereby incorporated by reference in its entirety.

BACKGROUND

1. Field

The present invention relates to a lens and a lighting device including the same.

2. Description of the Related Art

With low power consumption, a long life span and a low cost of a light emitting diode (LED), the LED is now used as a light source of various electronic devices, an electric sign, a lighting device and the like.

A lighting device designed to obtain a light distribution characteristic by adding a lens thereto has been already provided in lighting industry. In general, a lens for lighting devices has a wide irradiation surface by diffusing light or converges light having a high illuminance on a narrow irradiation surface.

SUMMARY

One embodiment is A light apparatus comprising: a light source including a substrate and at least one LED placed on the substrate; and a Lens on the light source,
  wherein the lens includes a light emitting surface and a bottom surface,
    wherein the light emitting surface comprises a center portion, a middle portion, an edge portion,
    wherein the center portion has a concave or convex shape and the edge portion has a convex shape and the middle portion is deposed between the center portion and the edge portion and has a predetermined inclination, and
    wherein at least one of a top surface of the center portion and a lateral surface of the edge portion have a curved line and a length from the bottom surface to top surface of the center portion, which is different from a length from the bottom surface to top surface of the middle portion.

Another embodiment is a lighting unit including:
  a light source including a substrate and at least one light emitting diode placed on the substrate; and
  a lens being placed on the substrate and including a flange,
    wherein the flange projects toward the substrate and has a space between the light emitting diode and the lens.

Further another embodiment is a lighting unit including:
  a light source including a substrate and a light emitting diode placed on the substrate;
  a gap member being placed on the light source and including a reflective portion and a wall coupled to the substrate, wherein the reflective portion includes a bottom surface placed on the top surface of the substrate and has a predetermined inclination; and
  a lens placed on the reflective portion of the gap member.

DETAILED DESCRIPTION OF THE EMBODIMENTS

A thickness or size of each layer is magnified, omitted or schematically shown for the purpose of convenience and clearness of description. The size of each component does not necessarily mean its actual size.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Hereinafter, the embodiment will be described with reference to the accompanying drawings.

Figure 1:
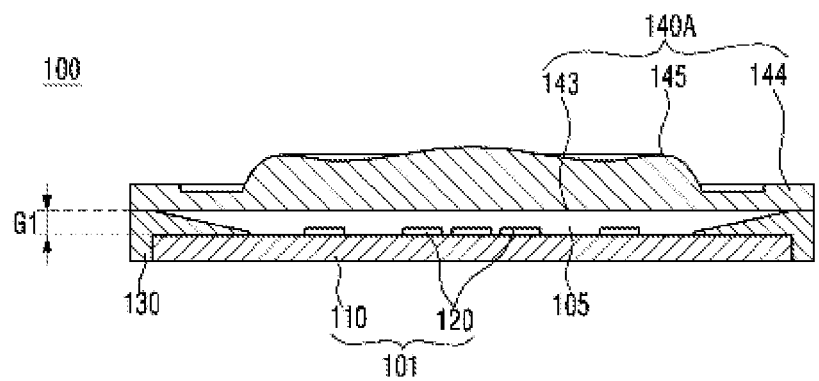
FIG. 1 is a cross-sectional side view of a lighting unit 100 using a lens 140A according to a first embodiment.
Figure 2:
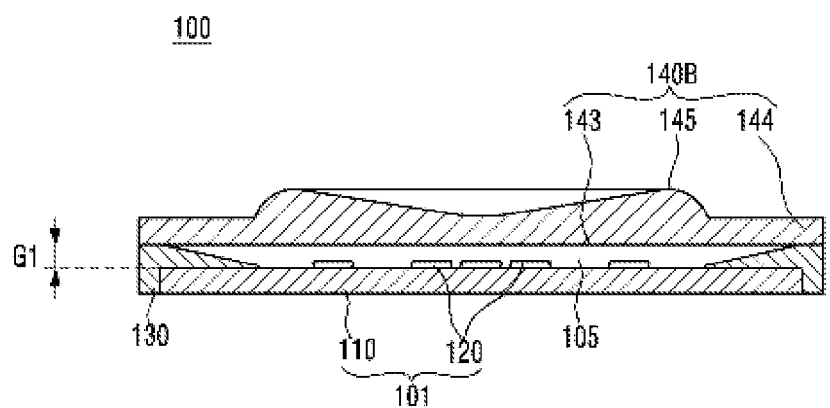
FIG. 2 is a cross-sectional side view of a lighting unit 100 using a lens 140B according to a second embodiment.
Figure 3:
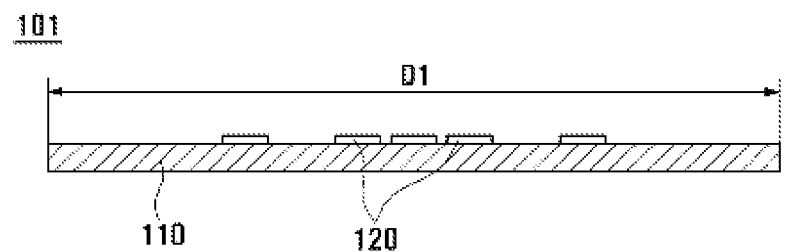
FIG. 3 is a cross-sectional side view of a light emitter 101 of FIG. 1.
Figure 4:
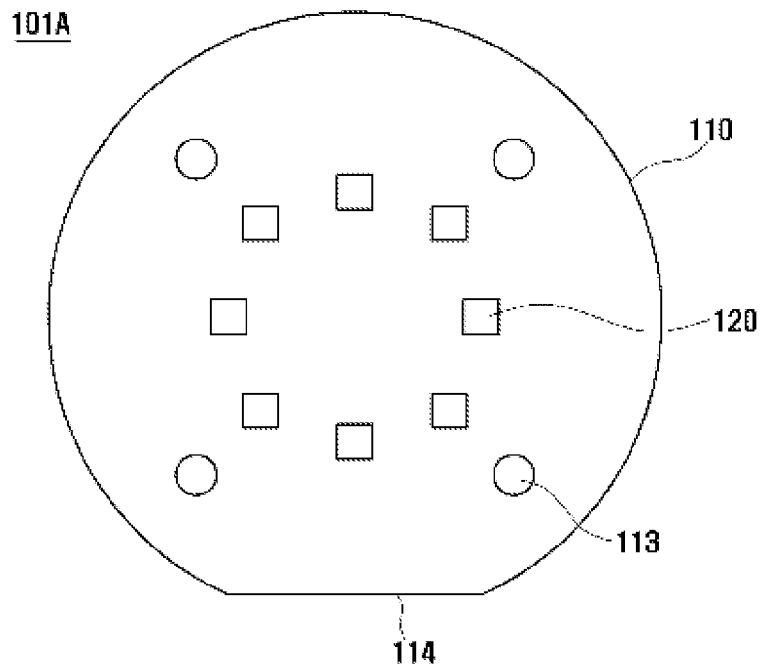
FIG. 4 is a plan view of the light emitter 101 of FIG. 1.
Figure 5:
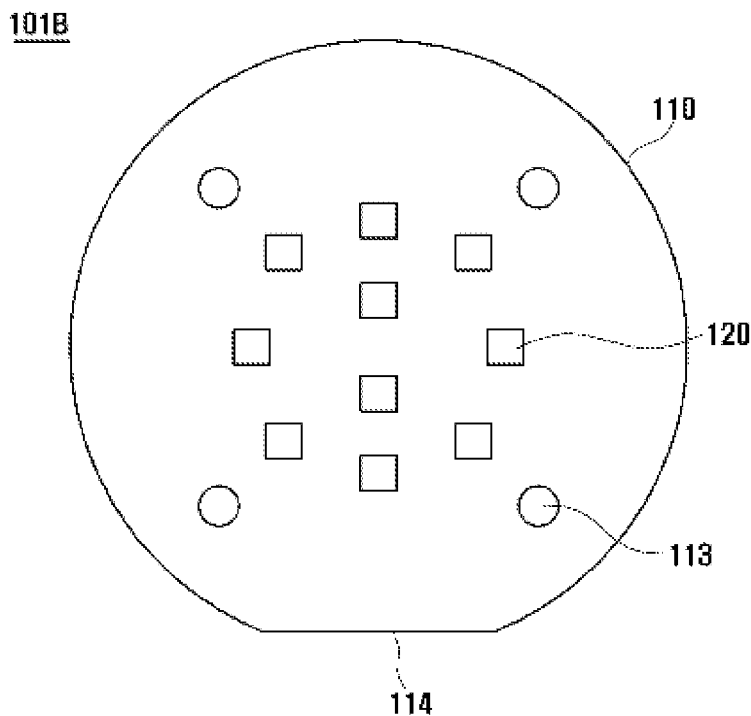
FIG. 5 shows another embodiment of the light emitter 101 of FIG. 1.
Figure 6:
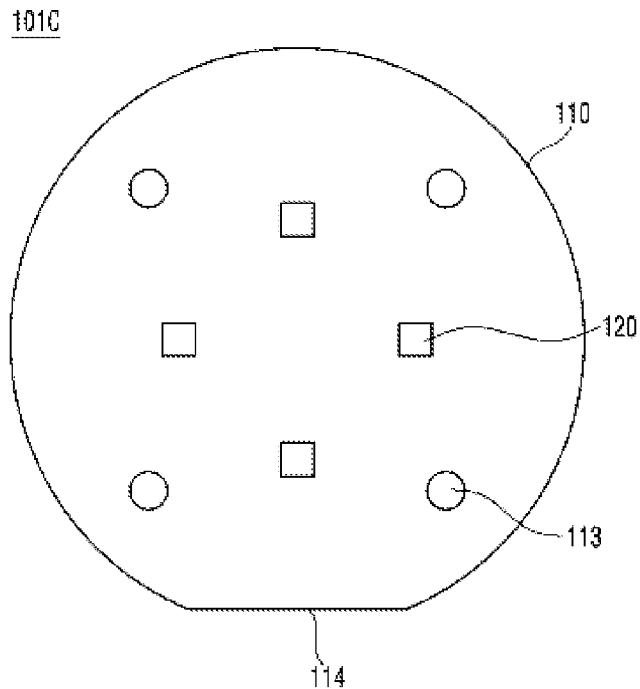
FIG. 6 shows further another embodiment of the light emitter 101 of FIG. 1.
Figure 7:
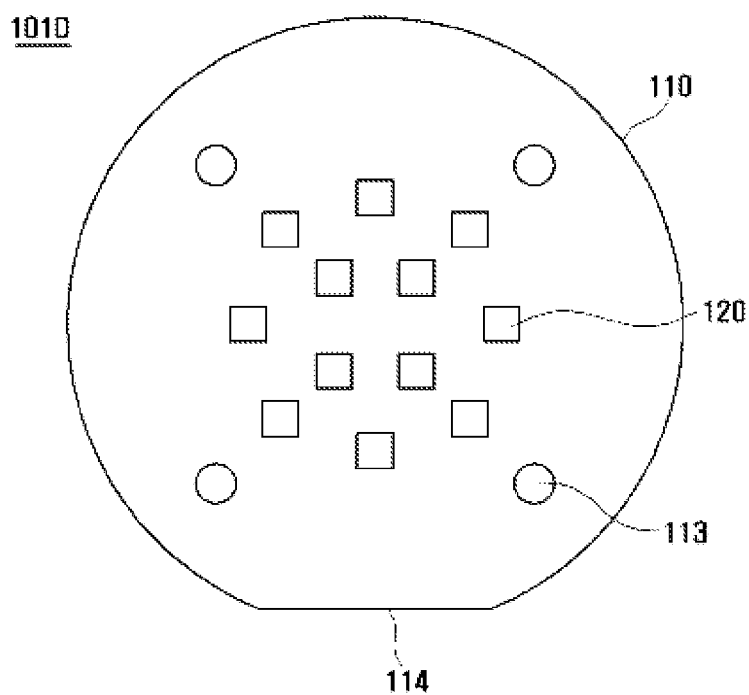
FIG. 7 shows yet another embodiment of the light emitter 101 of FIG. 1.

FIG. 1 is a cross-sectional side view of a lighting unit 100 using a lens 140A according to a first embodiment. FIG. 2 is a cross-sectional side view of a lighting unit 100 using a lens 140B according to a second embodiment. FIG. 3 is a cross-sectional side view of a light emitter 101 of FIG. 1. FIG. 4 is a plan view of the light emitter 101 of FIG. 1. FIG. 5 shows another embodiment of the light emitter 101 of FIG. 1. FIG. 6 shows further another embodiment of the light emitter 101 of FIG. 1. FIG. 7 shows yet another embodiment of the light emitter 101 of FIG. 1.

Referring to FIG. 1, the lighting unit 100 includes a light emitter 101, a gap member 130 and a lens 140. The lighting unit 100 is attached to exterior lamps such as outdoor lamps and street lamps placed at regular intervals, thereby illuminating with appropriate light distribution and illuminance distribution with respect to the front side of the outdoor lamps and a space between the street lamps. Although experimental data to be examined later are obtained by applying the outdoor lamp and the like, the lighting unit 100 can be also used indoors.

The light emitter 101 includes a substrate 110 and a plurality of LEDs 120 placed on the substrate 110. The plurality of the LEDs 120 may be arranged in various forms.

The substrate 110 includes an aluminum substrate, a ceramic substrate, a metal core PCB and a common PCB and the like. The substrate 110 may be made of a material capable of efficiently reflecting light and may have a color capable of efficiently reflecting light, for example, white and silver, etc.

The plurality of the LEDs 120 includes a white LED. A colored LED such as a red LED, a blue LED and a green LED can be selectively used as the plurality of the LEDs 120. The light emitting angle of the LED 120 is between 120° and 160°. The LED 120 may include Lambertian shape (a perfect diffusion surface). The substrate 110 of the light emitter 101 has, as shown in FIGS. 3 and 4, a disk shape having a predetermined diameter D1 for the substrate 110 to be received in the gap member 130.

A flat portion 114 is formed on the outer circumference of one side of the substrate 110. The flat portion 114 identifies where parts within the lighting units 100 are combined or prevents the parts from rotating.

A plurality of screw holes 113 are formed in the substrate 110. When a screw is inserted into the screw hole 113, the substrate 110 is fasten to facilities like a street lamp and an outdoor lamp, etc., or fasten to a case of the lighting unit 100. Here, it does not matter that a rivet and a hook, etc., as well as the screw are inserted into the screw holes 113. The substrate 110 may not have the screw holes 113.

The light emitter 101A of FIG. 4 includes eight LEDs 120 arranged on the substrate 110. The eight LEDs 120 may be arranged at a regular interval on a circumference having a predetermined radius from the center of the substrate 110. The eight LEDs 120 may be arranged on not only the circumference but also an ellipse or a quadrangle.

The light emitter 101B of FIG. 5 includes ten LEDs 120 arranged on the substrate 110. Here, eight out of the ten LEDs 120 may be arranged at a regular interval on a circumference having a predetermined radius from the center of the substrate 110, and two LEDs are arranged inside the circumference.

The light emitter 101C of FIG. 6 includes four LEDs 120 arranged on the substrate 110. Here, it is regarded that the four LEDs 120 are arranged at a regular interval on a circumference having a predetermined radius from the center of the substrate 110 or are arranged on a square.

The light emitter 101D of FIG. 7 includes twelve LEDs 120 arranged on the substrate 110. Here, eight out of the twelve LEDs 120 may be arranged at a regular interval on a circumference having a predetermined radius from the center of the substrate 110, and four LEDs are arranged at regular intervals on a circumference having a radius smaller than that of the above circumference.

The arrangements of the plurality of the LEDs 120 shown in FIGS. 4 to 7 are taken as examples. The plurality of the LEDs 120 are not necessarily arranged at a regular interval in accordance with the desired shape of an irradiation surface. The arrangement shape and the number of the LEDs 120 on the substrate 110 may be changed within the scope of the embodiment in accordance with intensity of light, light distribution, and illuminance distribution.

When a term of the light emitter 100 is used in the drawings or specification without mentioning the specific light emitters 101A, 101B, 101C and 101D having a specific arrangement of the LEDs 120, it should be understood that the term represents the light emitters having those arrangements.

Figure 8:
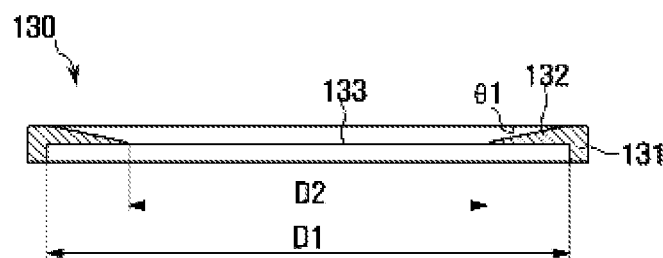
FIG. 8 is a cross-sectional side view of a gap member 130 of FIG. 1.
Figure 9:
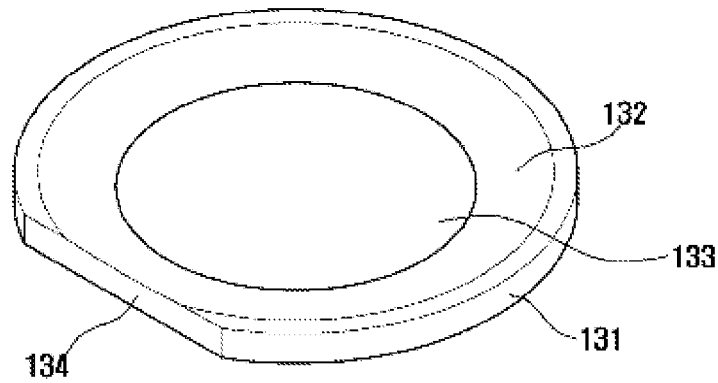
FIG. 9 is a perspective view of the gap member 130 of FIG. 1.
Figure 10:
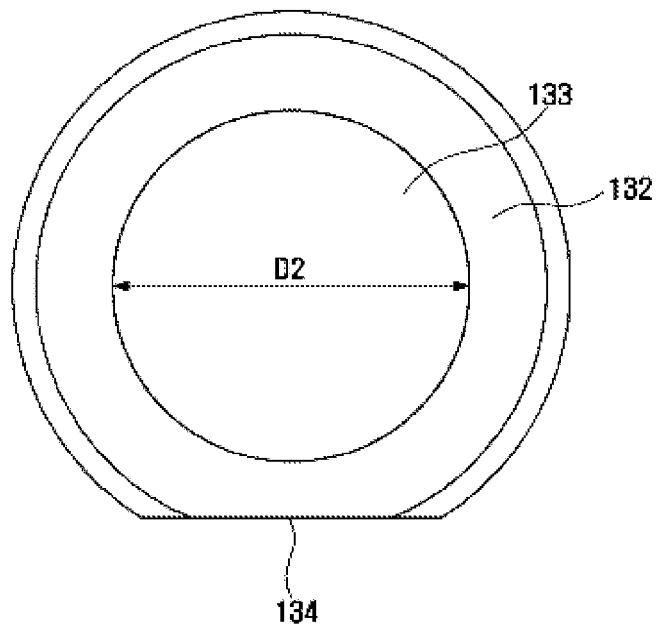
FIG. 10 is a plan view of the gap member 130 of FIG. 1.
Figure 11:
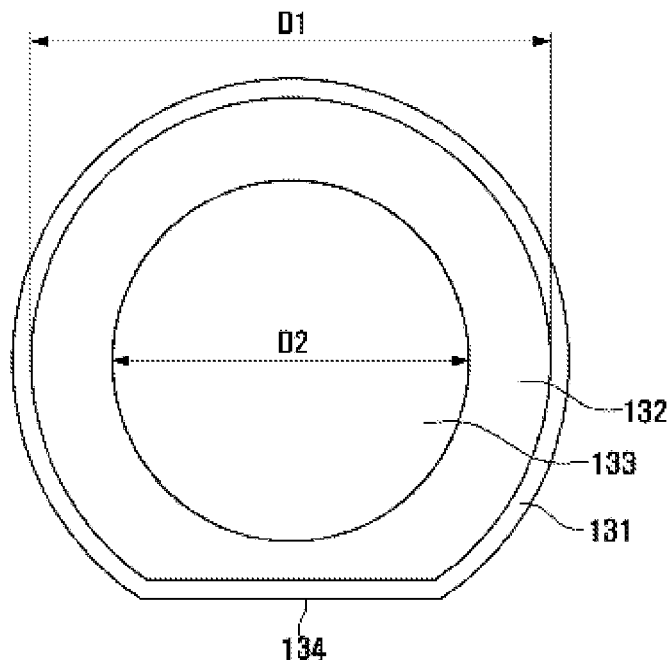
FIG. 11 is a bottom view of the gap member 130 of FIG. 1.
Figure 12:
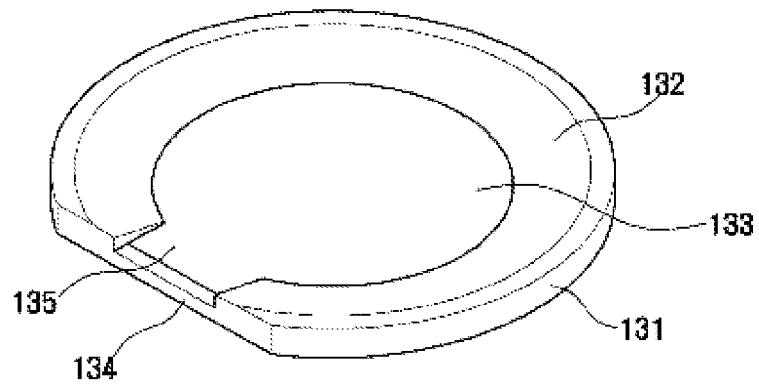
FIG. 12 is a perspective view of another example of the gap member 130 of FIG. 1.
Figure 13:
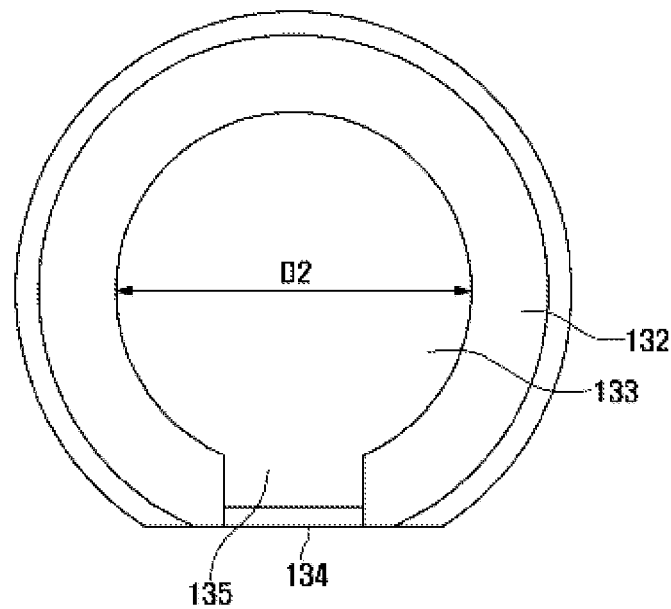
FIG. 13 is a plan view of another example of the gap member 130 of FIG. 1.
Figure 14:
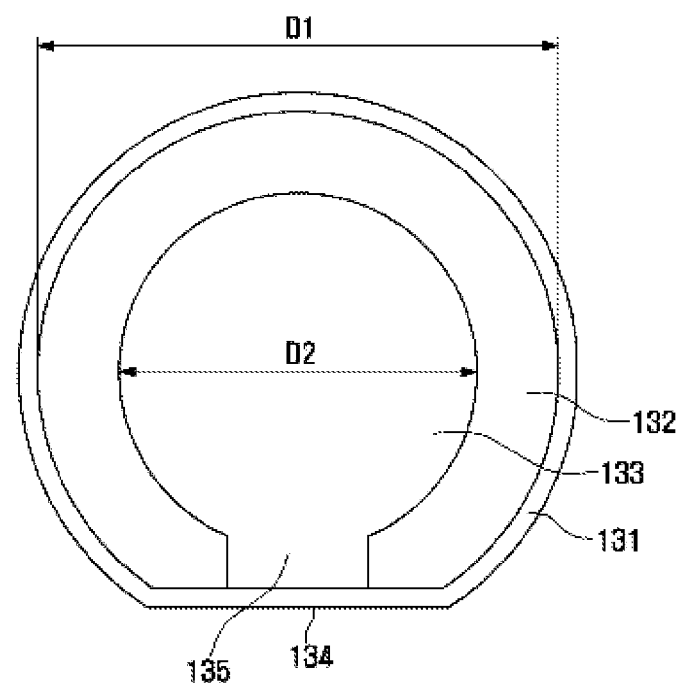
FIG. 14 is a bottom view of another example of the gap member 130 of FIG. 1.

FIG. 8 is a cross-sectional side view of a gap member 130 of FIG. 1. FIG. 9 is a perspective view of the gap member 130 of FIG. 1. FIG. 10 is a plan view of the gap member 130 of FIG. 1. FIG. 11 is a bottom view of the gap member 130 of FIG. 1. FIG. 12 is a perspective view of another example of the gap member 130 of FIG. 1. FIG. 13 is a plan view of another example of the gap member 130 of FIG. 1. FIG. 14 is a bottom view of another example of the gap member 130 of FIG. 1.

Referring to FIGS. 1, 2 and 8 to 14, the gap member 130 includes a reflective portion 132 and a wall 131. The reflective portion 132 has a ring shape having a surface inclined downward to the center of the gap member 130. The wall 131 has a ring shape extending downward and forming concentric circle with the reflective portion 132. In addition, since the gap member 130 overall has a flat ring shape, it includes an opening 133 having a diameter equal to the inner diameter of the reflective portion 132.

The reflective portion 132 reflects light emitted from the LED 120 to the outside without extinction of the light and increases light efficiency of the lighting device. Since the light is radiated to the upside of the reflective portion 132, the reflective portion 132 allows light to be emitted upward.

The bottom surface of the reflective portion 132 is in contact with the circumference of the top surface of the light emitter 101. The inner circumferential surface of the wall 131 is in contact with the outer circumference of the light emitter 101. Accordingly, the light emitter 101 is seated in the gap member 130. In order to prevent the light emitter 101 from separating upward from the gap member 130, it is recommended that the inner diameter of the reflective portion 132 is less than the inner diameter of the wall 131 and the outer diameter of the light emitter 101.

The gap member 130 leaves a space between the substrate 110 and the lens 140 by a predetermined gap G1. The gap G1 is larger than or equal to the thicknesses of the LEDs 120 arranged on the substrate 110. Therefore, the lens 140 does not press the LEDs 120. Besides, since there is a space 105 between the lens 140 and the substrate 110, it is possible to achieve a light emitting angle and light distribution.

The gap member 130 prevents a surface other than the bottom surface of the light emitter 101 from directly contacting with other members such as a case of the lighting unit. When the gap member 130 is made of an insulating material, the gap member 130 is insulated from the light emitting unit 101. In addition to this, when a thermal pad made of insulating material contacts closely with the bottom surface of the light emitter 101, the light emitter 101 is capable of preventing electric short, EMI, and EMS and the like and improving withstand voltage characteristic. The space 105 is filled with silicon or silicon resin material. The LEDs 120 of the light emitter 101 are exposed through the opening 133. A flange 144 of the lens 140 is disposed on the top surface of the gap member 130.

A flat portion 134 is formed on one side of the gap member 130. The flat portion 134 identifies where parts within the lighting units 100 are combined or prevents the parts from rotating. More specifically, like the substrate 110 of the light emitter 101 shown in FIGS. 4 to 7, it is supposed that the flat portion 114 is formed on one side of the substrate 110. As shown in FIGS. 9 to 14, it is supposed that the flat portion 134 is also formed in the gap member 130. Referring to FIG. 14, the inner surface as well as the outer surface of the flat portion 134 of the gap member 130 is flat, so that the substrate 110 is fixed to the gap member 130 in a state where the flat portion of the substrate 110 is in contact with the flat portion 134 of the gap member 140. Accordingly, the inner surface of the wall 131 and the outer surface of the substrate 110 neither rotate nor move.

The reflective portion 132 has a predetermined inclination and extends from the top surface of the wall 131 to the center of the opening 133. That is, the reflective portion 132 is formed inclined at a predetermined inclination angle θ1 on the outer circumference of the opening 133 of the gap member 130. Since the inclination surface of the reflective portion 132 is separated from the light incident surface 143 of the lens 140, the amount of reflected light may be changed in accordance with the inclination angle θ1 and the width of the reflective portion 132.

The opening 133 inside the reflective portion 132, as shown in FIGS. 9 to 11, may have a circular shape having a predetermined diameter D2. Light incident from the LED 120 to the reflective portion 132 is reflected at the reflective portion 132 and light emitted to the outside through the lens 140. Accordingly, an additional effect of improving light efficiency is obtained as compared with a common gap member having no reflective portion 132. It has been already described that the gap member 130 according to the embodiment more improves withstand voltage characteristic than a common gap member.

As shown in FIGS. 12 to 14, the gap member 130 includes an electrode-through portion 135 allowing electric wires or electrodes (not shown) connected to the substrate 110 to pass therethrough.

Although FIGS. 9 to 14 show the gap member 130 including the flat portion 134, there is no limit to this. For example, the gap member 130 can be expected, which has no flat portion 134 and overall has a circular shape. As regards the circular gap member 130 having no flat portion 134, parts within the lighting units 100 may rotate or move. However, the gap member 130 having no flat portion 134 has an effect of improving both the light efficiency and the withstand voltage characteristic, which the gap member 130 of the above described embodiment has. Therefore, it should be understood that an optimal embodiment of the present invention has been described without being limited to only the gap member 130 having the flat portion 134.

<Efficient Illuminance Distribution and Light Distribution>

Figure 15:
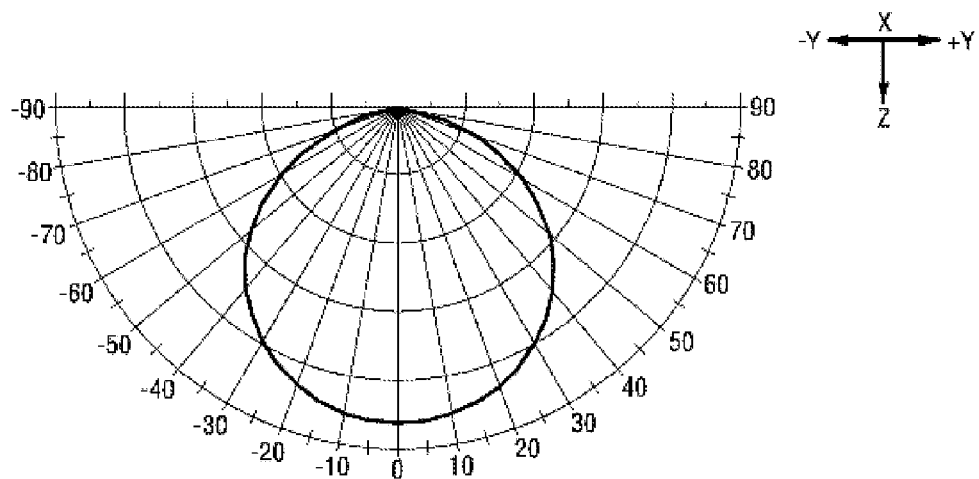
FIG. 15 shows a spatial light distribution chart of an LED lighting device having no lens.
Figure 16:
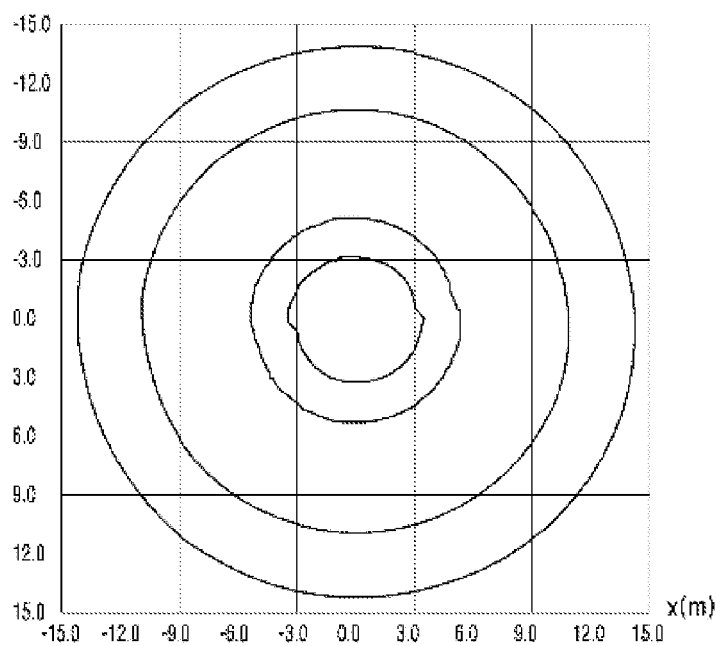
FIG. 16 shows an illuminance distribution chart of an LED lighting device having no lens.

FIG. 15 shows a spatial light distribution chart of an LED lighting device having no lens. FIG. 16 shows an illuminance distribution chart of an LED lighting device having no lens.

Referring to FIG. 16, the illuminance distribution of an LED lighting device having no lens forms a circular shape. Referring to FIG. 15, the spatial light distribution of the LED lighting device having no lens forms a water-drop shape or a balloon shape. Here, this is not limited to the LED lighting device having no lens. A lighting device including one light emitting device or many light emitting devices which are arranged on a concentric circle or densely arranged generally has the same spatial light distribution and illuminance distribution as those of the LED lighting device having no lens.

In a lighting device necessary to form a circular illuminance distribution on an irradiation surface, lighting quality depends on the uniformity of illuminance on the irradiation surface. For example, if a bright portion of the irradiation surface is narrowly formed and the rest of the irradiation area is dark, it means that the lighting quality is poor. If the spatial light distribution has, as shown in FIG. 15, a water-drop shape or a balloon shape, a position just below a light source is brightly and intensively illuminated and a position beyond the central circular area of the light source becomes rapidly and immediately dark. Like this, when the illuminance difference is apparent, a user may easily feel fatigue of his/her eyes and work efficiency may be deteriorated due to the non-uniform light distribution. Therefore, it is recommended that the spatial light distribution has an approximately conical shape close to a cone. In this case, much light is not concentrated around the central portion of the irradiation surface. The illuminance is not excessively increased and light is entirely uniformly distributed. As a result, it is possible to reduce the fatigue of eyes of a person who is under the lighting device.

Hereafter, through experimental data of the lens 140A of the first embodiment and the lens 140B of the second embodiment, it will be found that the lens 140 of the embodiments has efficient spatial light distribution and illuminance distribution. Meanwhile, a lighting device including many light emitting devices generally arranged therein may have an illuminance distribution shape on an irradiation surface, which may considerably change according to the arrangement of the light emitting devices. However, the lighting device of the embodiment of the present invention has an advantage that illuminance distribution on the irradiation surface of light emitted through the lens is not actually affected even though the light emitting devices emitting light to the light incident surface are variously arranged. This advantage will be also found through the experimental data.

<A Shape of a Lens Showing Efficient Illuminance Distribution and Light Distribution>

The lens 140A of the first embodiment and the lens 140B of the second embodiment representatively include a shape including the following efficient experimental example to be described. The overall structure of such a lens 140 will be first described.

Figure 17:
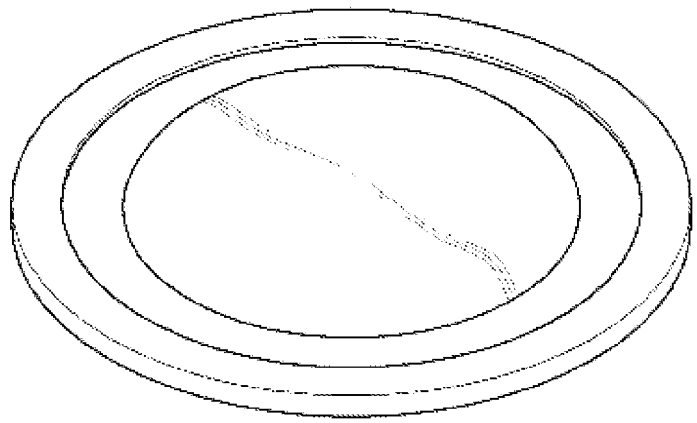
FIG. 17 is a perspective view of the lens 140A of the first embodiment.
Figure 18:
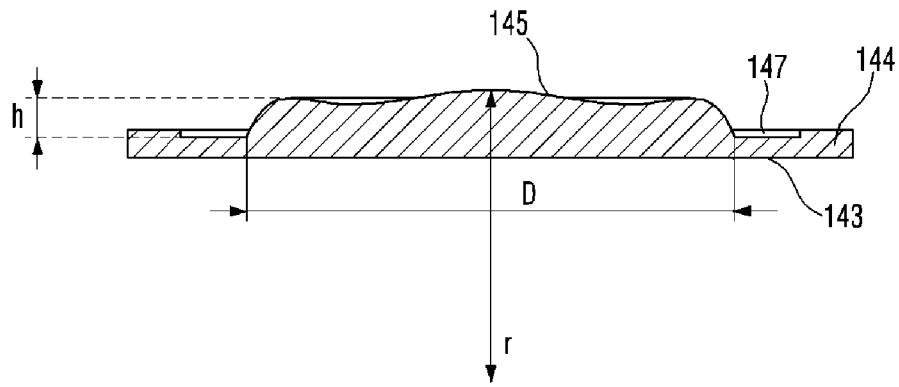
FIG. 18 is a cross-sectional side view of the lens 140A of the first embodiment.
Figure 19:
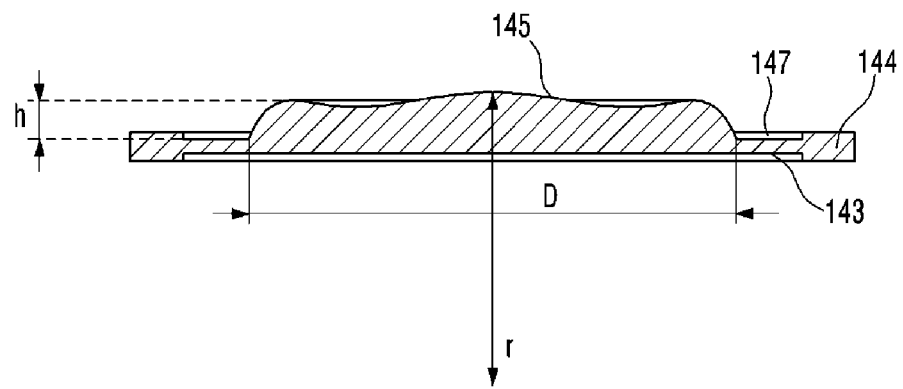
FIG. 19 is a cross-sectional side view of a modified example of the lens 140A of the first embodiment.
Figure 20:
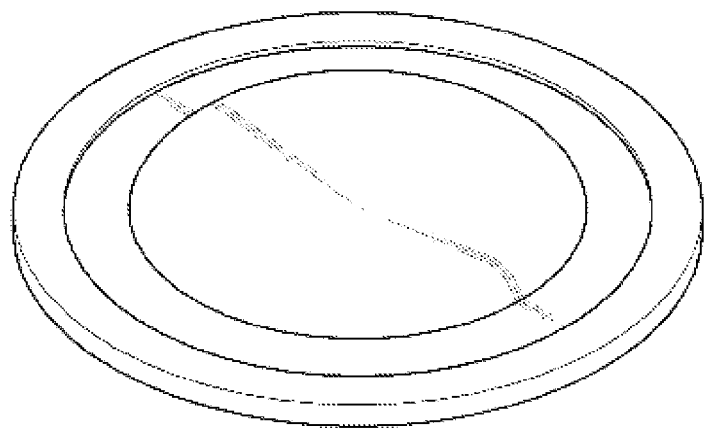
FIG. 20 is a perspective view of the lens 140B of the second embodiment.
Figure 21:
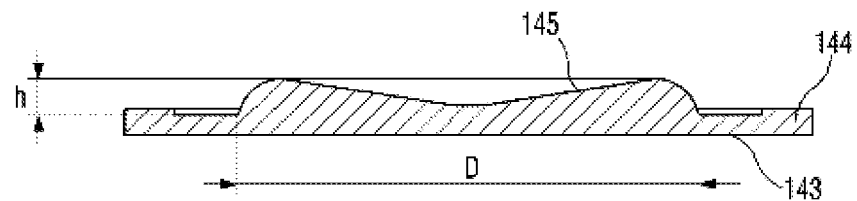
FIG. 21 is a cross-sectional side view of the lens 140B of the second embodiment.
Figure 22:
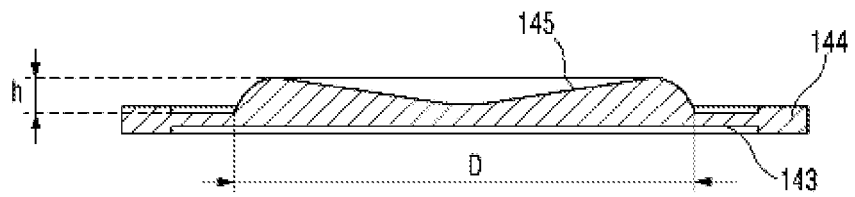
FIG. 22 is a cross-sectional side view of a modified example of the lens 140B of the second embodiment.

FIG. 17 is a perspective view of the lens 140A of the first embodiment. FIG. 18 is a cross-sectional view of the lens 140A of the first embodiment. FIG. 19 is a cross-sectional view of a modified example of the lens 140A of the first embodiment. FIG. 20 is a perspective view of the lens 140B of the second embodiment. FIG. 21 is a cross-sectional view of the lens 140B of the second embodiment. FIG. 22 is a cross-sectional view of a modified example of the lens 140B of the second embodiment.

Referring to FIGS. 1, 2 and 17 to 22, the lens 140 is placed on the light emitter 101. The lens 140 includes a light incident surface 143 and a light emitting surface 145. A circular flange 144 is formed on the circumference of the light incident surface 143 of the lens 140.

Comparing FIG. 18 with FIG. 19, the flange 144 of FIG. 18 is different from the flange 144 of FIG. 19. Since the shape of the flange 144 has no direct influence on the function of the lens 140, the flange 144 can have various shapes. The lens 140 is injection-molded by using a light-transmitting material which includes glass and a plastic material such as Poly methyl methacrylate (PMMA) and Polycarbonate (PC) and the like.

Here, the flange 144 includes a groove 147. The groove 147 is formed on the circumference of the light emitting surface 145. A packing (not shown) may be disposed in the groove 147. The packing (not shown) is disposed between the groove 147 of the lens 140 and a case (not shown) to be placed on the lens 140, and prevents impurity from coming into the inside of the lighting unit of the present invention.

The light emitting surface 145 reflects or refracts incident light and emits to the outside. The light emitting surface 145 is formed by an aspheric lens or is formed through a combination of the aspheric lens and a body of rotation obtained by rotating a Bezier curve around an optical axis. The former corresponds to the lens 140A of the first embodiment and the latter corresponds to the lens 140B of the second embodiment. The shape of the aspheric surface and the Bezier curve are selected by considering the light distribution and the illuminance distribution. The aspheric surface and the Bezier curve will be described later in detail.

Referring to FIGS. 18, 19, 21 and 22, the lens having the light emitting surface 145 formed by the aspheric lens or formed through a combination of the aspheric lens and a body of rotation obtained by rotating the Bezier curve around an optical axis will be described in detail. Here, "h" represents a height of the light emitting surface 145. "D" represents a width of the light emitting surface 145. "r" represents a curvature radius of the light emitting surface 145. An equation representing the light emitting surface 145 of the shape of the aspheric lens will be described in the following equation (1).

$$z = \frac{\frac{1}{r}\left(\frac{D}{2}\right)^2}{1+\sqrt{1-(1+k)\left(\frac{1}{r}\right)^2\left(\frac{D}{2}\right)^2}} + \sum_{n=2}^{10} C_{2n}\left(\frac{D}{2}\right)^{2n} \quad \text{equation (1)}$$

The equation (1) satisfies a relationship of $$\left(\frac{D}{2}\right)^2 = x^2 + y^2.$$

"z" represents a height from the light incident surface 143 to the light emitting surface 145. "D" represents a width of the light emitting surface 145. "r" represents a curvature radius of the light emitting surface 145. "k" represents a conic constant. $C_{2n}$ represents an aspheric surface coefficient.

Any aspheric lens including the shape of the light emitting surface 145 satisfying the equation (1) is accepted. The shape of the aspheric surface changes according to the conic constant of "k". When k=0, the aspheric surface has a spherical shape. When −1<k<0, the aspheric surface has an elliptical shape. When k=−1, the aspheric surface has a parabolic shape. When k<−1, the aspheric surface has a hyperbolic shape. When k>0, the aspheric surface has an oblate spherical shape.

There are many cases in which the light emitting surface 145 satisfies the equation (1). The lens 140A of the first embodiment is one of examples satisfying the equation (1) and will be described in the following experimental examples 1, 2, 3 and 4. In the lens used in the experimental examples 1, 2, 3 and 4, the specification of the lens satisfying the equation (1) is as follows. "h" is 3.33 mm, "D" is 34.67 mm, "r" is 21.79 mm and "k" is −2.88. In $C_{2n}$, a spherical coefficient actually affecting the shape of the light emitting surface is $C_4$, $C_6$, $C_8$, and $C_{10}$. $C_4$ is $-9.54e^{-5}$, $C_6$ is $-2.54e^{-7}$, $C_8$ is $1.43\ e^{-9}$ and $C_{10}$ is $6.48e^{-13}$.

The lens 140B of the second embodiment is obtained by subtracting a body of rotation obtained by rotating the Bezier curve around an optical axis from the lens 140A having the shape of the light emitting surface satisfying the equation (1).

Figure 23:
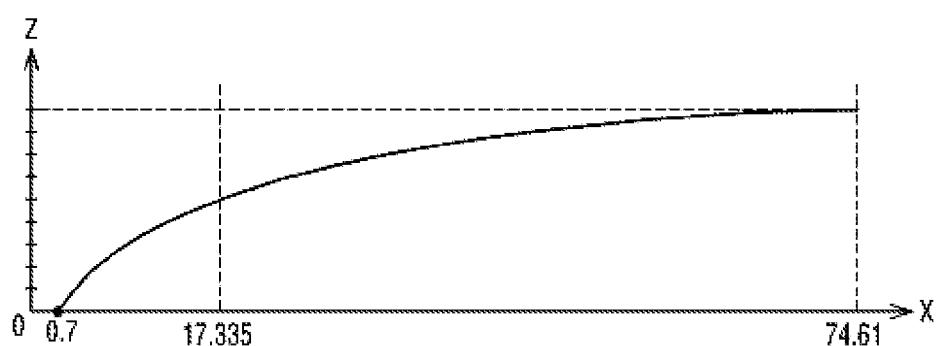
FIG. 23 shows a Bezier curve used to define a light emitting surface of the second embodiment.
Figure 24:
FIG. 24 is a cross-sectional side view of a body of rotation obtained by rotating the Bezier curve of FIG. 23 around Z-axis.

Referring to FIG. 23, an interval between z-axis scales is 0.758 mm Therefore, when Z is equal to 0, X is 0.7 mm When Z is equal to 6.822, X is 74.61 m. The Bezier curve used to form the shape of the lens 140B of the second embodiment is shown in detail in the following Table 1.

TABLE 1

|   | 1 | 2 | 3 | 4 | 5 | 6 | 7 | 8 | 9 | 10 |
|---|---|---|---|---|---|---|---|---|---|----|
| Z | 0 | 0.758 | 1.516 | 2.274 | 3.032 | 3.79 | 4.548 | 5.306 | 6.064 | 6.822 |
| X | 0.7 | 4.397454 | 9.086065 | 14.62931 | 20.9845 | 28.18103 | 36.33503 | 45.72182 | 57.06727 | 74061 |

Since "D" of the lens 140A of the first embodiment is 34.67 mm, the Bezier curve of FIG. 23 is selected within a range of X from 0 to 17.335 mm, and then a rotation body obtained by rotating the selected Bezier curve around Z-axis is subtracted from the lens 140A of the first embodiment. More specifically, with respect to a Z coordinate value ($Z_1$) corresponding to both one X coordinate value and one Y coordinate value of the lens 140A of the first embodiment, a Z coordinate value ($Z_2$) corresponding to both the corresponding X coordinate value and the corresponding Y coordinate value of the Bezier curve is subtracted from the $Z_1$, so that a value of $Z_1-Z_2$ is obtained, which corresponds to a Z coordinate value corresponding to the corresponding X and Y coordinate values of the lens 140B of the second embodiment. The lens 140B of the second embodiment will be described later through experimental examples 5, 6, 7, 8 and 9.

The lens 140A of the first embodiment and the lens 140B of the second embodiment are not limited to the experimental particular numerical values. Any lens having the same shape and ratio as those of the lenses 140A and 140B can be regarded as the lenses 140A and the lens 140B.

Consequently, as regards a cross-sectional shape formed by cutting the lens 140A along the plane thereof including the optical axis (i.e., Z-axis), the middlemost portion of the light emitting surface 145 rises and a concave surface is formed between the middlemost portion of the light emitting surface 145 and the outer edge of the light emitting surface 145. A surface is inclined downward between the outer edge of the light emitting surface 145 and the outermost edge of the light emitting surface 145. The shape of the light emitting surface 145 has been described on the basis of the optical axis, the outer edge of the light emitting surface 145 and the outermost edge of the light emitting surface 145. Outlines of the cross-sections at the interfaces among the optical axis, the outer edge and the outermost edge are smoothly curved and not angular.

As regards, a cross-sectional shape formed by cutting the lens 140B along the plane thereof including the optical axis (i.e., Z-axis), the middlemost portion of the light emitting surface 145 falls. A surface between the middlemost portion of the light emitting surface 145 and the outer edge of the light emitting surface 145 is smoothly inclined upward. A surface is steeply inclined downward from the outer edge of the light emitting surface 145 to the outermost edge of the light emitting surface 145. The surfaces inclined upward and downward are smoothly curved and not angular. The middlemost portion of the light emitting surface 145 may have a narrow flat portion, an acute point or a curved surface which smoothly falls.

It is necessary to examine not only the spatial light distribution chart and illuminance distribution chart of the experimental examples 1 to 9 but the efficiency of the lighting unit that uses the lens 140. Therefore, simulation data obtained by using a computer program called FTE Calculator will be taken as an example in order to examine the efficiency the lighting unit 100. The simulation of the computer program intends to obtain Energy Star certification and verify the efficiency of the lighting unit 100. Therefore, Energy Star certification and the simulation data will be described below.

<Energy Star Certification and Examination of Light Efficiency of Irradiation Surface>

Energy Star is an international program about energy efficiency in the United States and also a common program of department of energy (DOE) and environmental protection agency (EPA) of the United States, and gives an "ENERGY STAR" mark to a product satisfying an energy efficiency guideline. Many consumers in the Unite States have a high preference for products that obtained the Energy Star mark. Also, there are advantages from the product that obtained the Energy Star mark in accordance with the local governments. For these reasons, merchantability of products can be highly improved by obtaining the Energy Star certification.

The Energy Star certification means that a lighting device consumes less electric power to illuminate an area to be illuminated with a predetermined illuminance and the number of necessary lighting devices can be reduced. Therefore, a lighting device that has obtained the Energy Star certification is regarded as a high efficiency lighting device.

Since the lens 140 presented in the embodiment relating to the present invention is generally used in the lighting unit 100 that is attached to exterior lamps such as outdoor lamps and street lamps and the like, the lens 140 should meet Outdoor Area & Parking Garage of Category A in an Energy Star standard. The computer program called FTE Calculator is used to make sure that the lens 140 meets the standard. It is clearly understood by those skilled in the art that the computer program is easily obtained.

Figure 25:
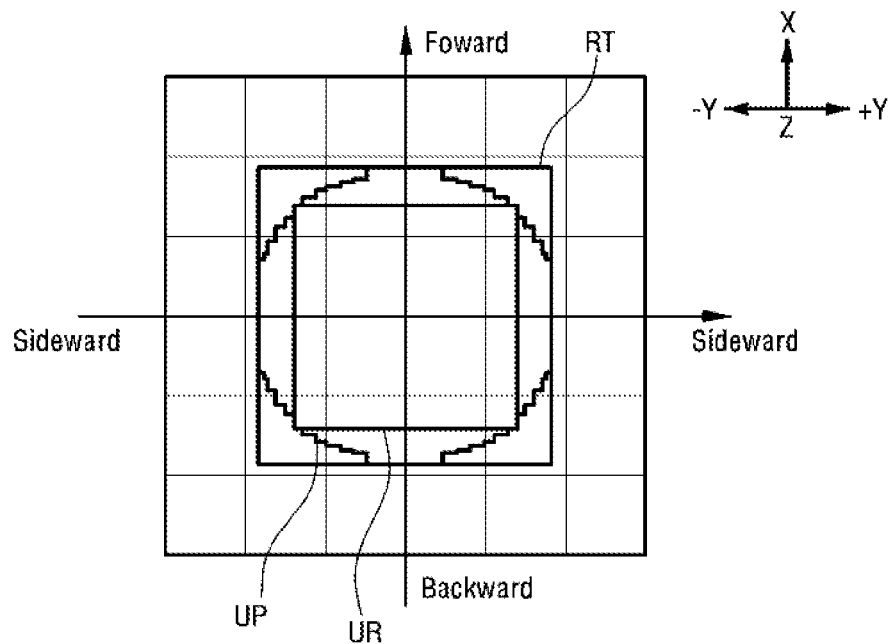
FIG. 25 shows illuminance distribution of an irradiation surface in accordance with FTE calculator.

FIG. 25 shows illuminance distribution of an irradiation surface in accordance with FTE calculator.

Referring to FIG. 25, RT represents a Rectangular Target, UP represents a Uniform Pool, UR represents a Uniform Rectangle, Sideward represents illuminance distribution in +Y and −Y directions, Forward represents illuminance distribution in +X direction, and Backward represents illuminance distribution in −X direction. The simulation data to be examined is based on the illuminance distribution of the irradiation surface when all of the light sources were at a height of 10 m. In FIG. 25, the width of each lattice is 10 m in both length and breadth. For example, when the Sideward is 1.8, it means that the illuminance distribution occurs in a space within 18 m in the +Y direction from the irradiation surface and 18 m in the −Y direction from the irradiation surface. The simulation data is based on Unshielded in Outdoor Area & Parking Garage of Category A in the Energy Star Standard when the lighting device having luminaire output of about 9000 lm is assumed. In this case, an FTE value (lm/W) should be 53 in order to meet the Energy Star standard. Input electric power is measured to be 120 W. In the experimental example, an efficient lighting device has a larger Uniform Rectangle (UR), a higher ratio of the area of the Uniform Pool (UP) occupies in the area of Rectangular Target (RT) to the area of Rectangular Target (RT) of the irradiation surface (hereafter, referred to as 'Covered') and wider Forward, Backward and Sideward in both Rectangular Target (RT) and Uniform Rectangular (UR).

Hereafter, the Covered will be described in detail. For example, it is assumed that a maximum illuminance value is set as 30 in an area on which light emitted from the lighting device is irradiated and a minimum illuminance value is set as 1. Here, the values of 30 and 1 are not absolute values and represent a ratio therebetween. Further, an area 51 is specified to have an illuminance value equal to or greater than 1 and equal to or less than 30. When an average illuminance value in the specified area 51 is greater than 6 which is six times the minimum illuminance value of 1, an area having an illuminance value of 1 is excluded. When the minimum illuminance value is 1.1 after the area having the illuminance value of 1 is excluded, the irradiation area corresponds to an area S2 having an illuminance value equal to or greater than 1.1 and equal to or less than 30. When it is determined that an average illuminance value of the area S2 is equal to or less than 6.6 which is six times the minimum illuminance value of 1.1, the area S2 is specified as the Uniform Pool (UP). When greater than 6.6, the above-mentioned procedure is repeated until the average illuminance value is not greater than six times the minimum illuminance value, so that Sn is specified as the Uniform Pool (UP). A rectangle surrounding the Sn specified in this manner is called Rectangular Target (RT). Consequently, the Covered represents a value of (UP/RT)*100.

Although the simulation data have been measured based on the aforementioned assumption and numerical values, required FTE value, the Covered and efficient shape may be changed in accordance with the use, installation height, input voltage, output intensity of light, etc., of the lighting device. For example, the numerical values used in the simulation are taken as an example. Therefore, the simulation data can be measured by the FTE Calculator on the basis of the Unshielded type, and the required FTE value may change, for example, 37, 48 and 70 and the like. Since the numerical values used in each experimental example have been already described, the description thereof will be omitted.

The experimental example 1 relates to the lighting unit 100 including the lens 140A of the first embodiment and the light emitter in which four LEDs are arranged. Here, Covered is 76%, the FTE (lm/W) is 49, Forward of the FTE (Regular Target) is 1.7, Sideward of the FTE (Regular Target) is 1.7, Backward of the FTE (Regular Target) is 1.6, Forward of the FTE (Uniform Target) is 1.2, Sideward of the FTE (Uniform Target) is 1.1, and Backward of the FTE (Uniform Target) is 1.1.

Figure 26:
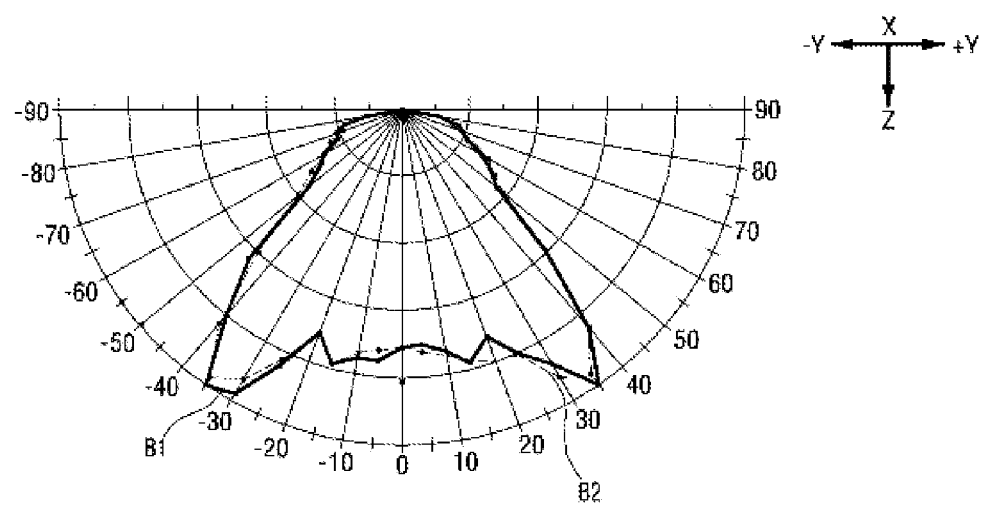
FIG. 26 shows a spatial light distribution chart by the lighting unit 100 including the lens 140A of the first embodiment and a light emitter in which four LEDs are arranged.
Figure 27:
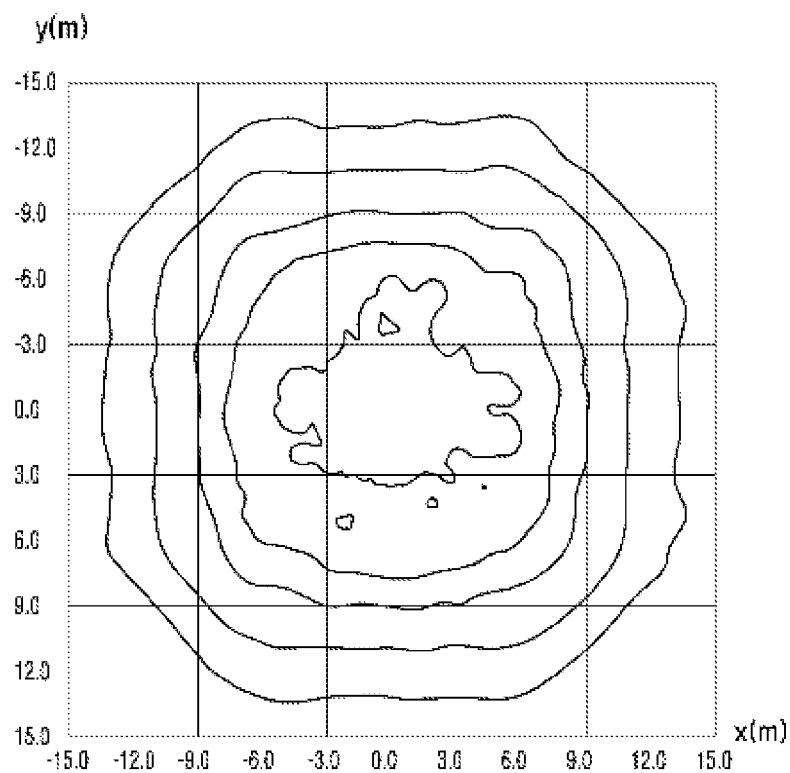
FIG. 27 shows an illuminance distribution chart by the lighting unit 100 including the lens 140A of the first embodiment and a light emitter in which four LEDs are arranged.

FIG. 26 shows a spatial light distribution chart by the lighting unit 100 including the lens 140A of the first embodiment and a light emitter in which four LEDs are arranged. FIG. 27 shows an illuminance distribution chart by the lighting unit 100 including the lens 140A of the first embodiment and a light emitter in which four LEDs are arranged. It can be found that the spatial light distribution of FIG. 26 is much closer to a cone as compared with that of FIG. 15, and two central bands of FIG. 27 are much bigger than those of FIG. 16.

The experimental example 2 relates to the lighting unit 100 including the lens 140A of the first embodiment and the light emitter in which eight LEDs are arranged. Here, Covered is 83%, the FTE (lm/W) is 53, Forward of the FTE (Regular Target) is 1.6, Sideward of the FTE (Regular Target) is 1.6, Backward of the FTE (Regular Target) is 1.6, Forward of the FTE (Uniform Target) is 1.2, Sideward of the FTE (Uniform Target) is 1.1, and Backward of the FTE (Uniform Target) is 1.2.

Figure 28:
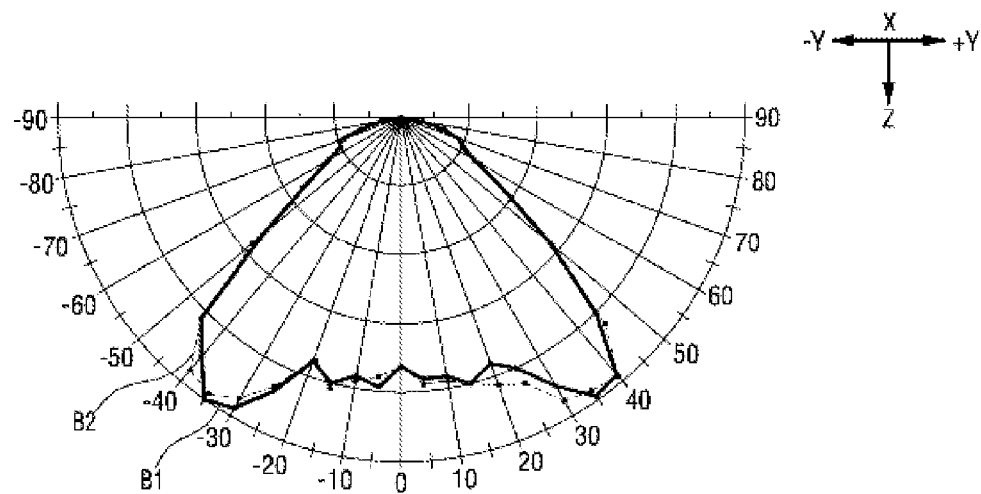
FIG. 28 shows a spatial light distribution chart by the lighting unit 100 including the lens 140A of the first embodiment and a light emitter in which eight LEDs are arranged.
Figure 29:
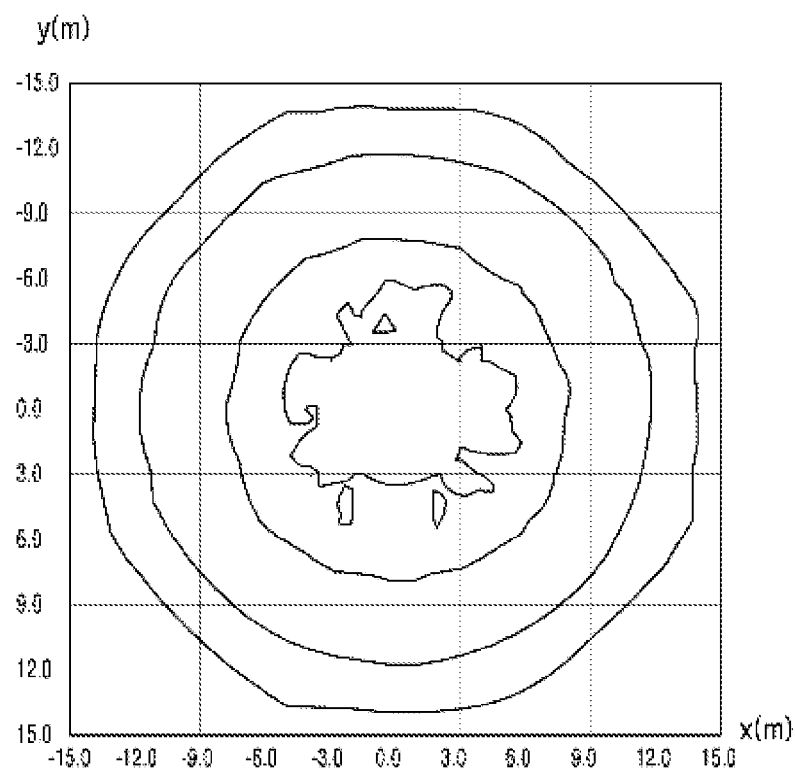
FIG. 29 shows an illuminance distribution chart by the lighting unit 100 including the lens 140A of the first embodiment and a light emitter in which eight LEDs are arranged.

FIG. 28 shows a spatial light distribution chart by the lighting unit 100 including the lens 140A of the first embodiment and a light emitter in which eight LEDs are arranged. FIG. 29 shows an illuminance distribution chart by the lighting unit 100 including the lens 140A of the first embodiment and a light emitter in which eight LEDs are arranged. It can be found that the spatial light distribution of FIG. 26 is much closer to a cone as compared with that of FIG. 15, and two central bands of FIG. 27 are much bigger than those of FIG. 16.

The experimental example 3 relates to the lighting unit 100 including the lens 140A of the first embodiment and the light emitter in which ten LEDs are arranged. Here, Covered is 81%, the FTE (lm/W) is 52, Forward of the FTE (Regular Target) is 1.7, Sideward of the FTE (Regular Target) is 1.7, Backward of the FTE (Regular Target) is 1.6, Forward of the FTE (Uniform Target) is 1.2, Sideward of the FTE (Uniform Target) is 1.1, and Backward of the FTE (Uniform Target) is 1.2.

Figure 30:
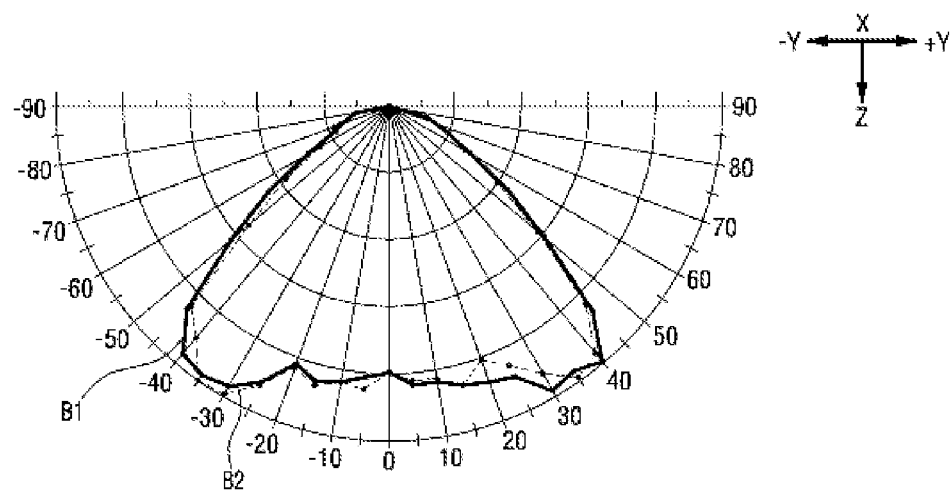
FIG. 30 shows a spatial light distribution chart by the lighting unit 100 including the lens 140A of the first embodiment and a light emitter in which ten LEDs are arranged.
Figure 31:
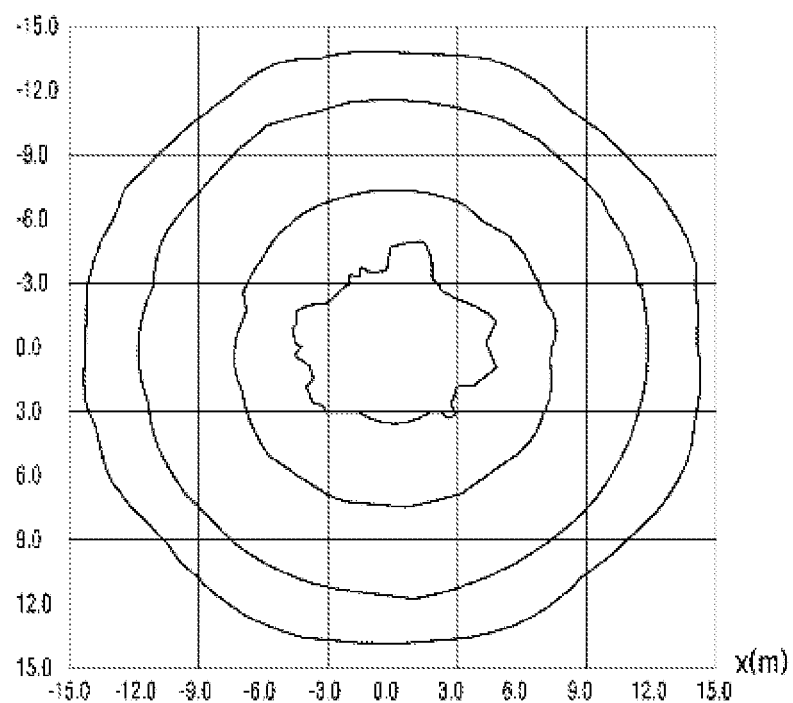
FIG. 31 shows an illuminance distribution chart by the lighting unit 100 including the lens 140A of the first embodiment and a light emitter in which ten LEDs are arranged.

FIG. 30 shows a spatial light distribution chart by the lighting unit 100 including the lens 140A of the first embodiment and a light emitter in which ten LEDs are arranged. FIG. 31 shows an illuminance distribution chart by the lighting unit 100 including the lens 140A of the first embodiment and a light emitter in which ten LEDs are arranged. It can be found that the spatial light distribution of FIG. 30 is much closer to a cone as compared with that of FIG. 15, and two central bands of FIG. 31 are much bigger than those of FIG. 16.

The experimental example 4 relates to the lighting unit 100 including the lens 140A of the first embodiment and the light emitter in which twelve LEDs are arranged. Here, Covered is 82%, the FTE (lm/W) is 54, Forward of the FTE (Regular Target) is 1.7, Sideward of the FTE (Regular Target) is 1.8, Backward of the FTE (Regular Target) is 1.7, Forward of the FTE (Uniform Target) is 1.3, Sideward of the FTE (Uniform Target) is 1.3, and Backward of the FTE (Uniform Target) is 1.3.

Figure 32:
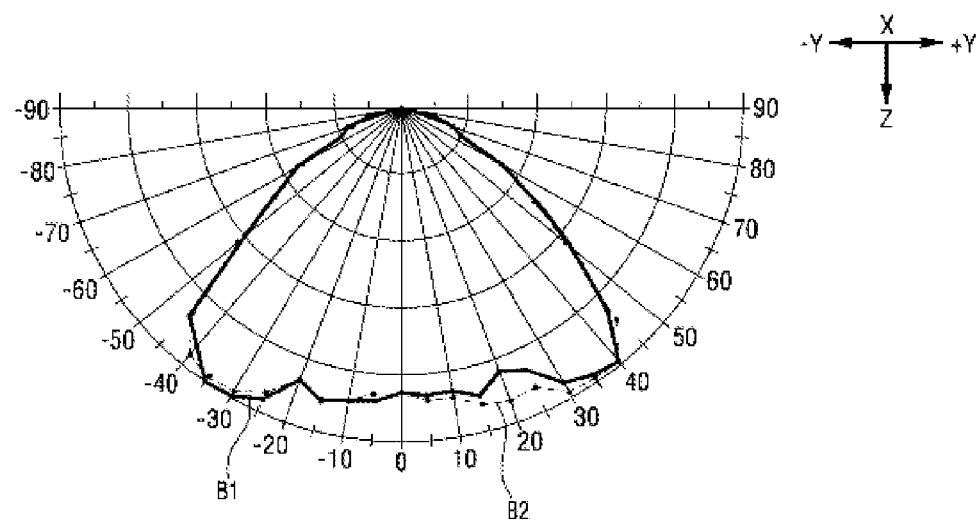
FIG. 32 shows a spatial light distribution chart by the lighting unit 100 including the lens 140A of the first embodiment and a light emitter in which twelve LEDs are arranged.
Figure 33:
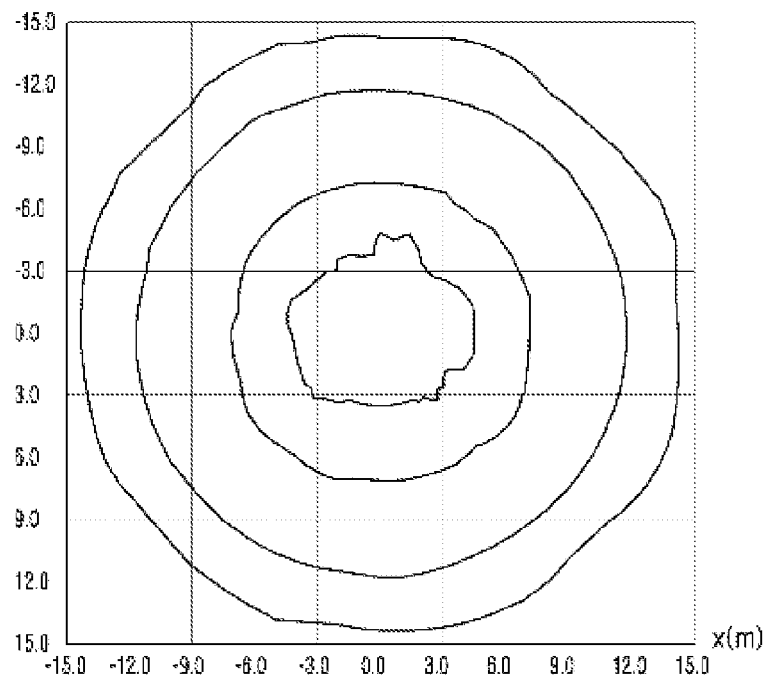
FIG. 33 shows an illuminance distribution chart by the lighting unit 100 including the lens 140A of the first embodiment and a light emitter in which twelve LEDs are arranged.

FIG. 32 shows a spatial light distribution chart by the lighting unit 100 including the lens 140A of the first embodiment and a light emitter in which twelve LEDs are arranged. FIG. 33 shows an illuminance distribution chart by the lighting unit 100 including the lens 140A of the first embodiment and a light emitter in which twelve LEDs are arranged. It can be found that the spatial light distribution of FIG. 32 is much closer to a cone as compared with that of FIG. 15, and two central bands of FIG. 33 are much bigger than those of FIG. 16.

The experimental example 5 relates to the lighting unit 100 including the lens 140B of the second embodiment and the light emitter in which four LEDs are arranged. Here, Covered is 79%, the FTE (lm/W) is 53, Forward of the FTE (Regular Target) is 1.6, Sideward of the FTE (Regular Target) is 1.7, Backward of the FTE (Regular Target) is 1.6, Forward of the FTE (Uniform Target) is 1.2, Sideward of the FTE (Uniform Target) is 1.2, and Backward of the FTE (Uniform Target) is 1.2.

Figure 34:
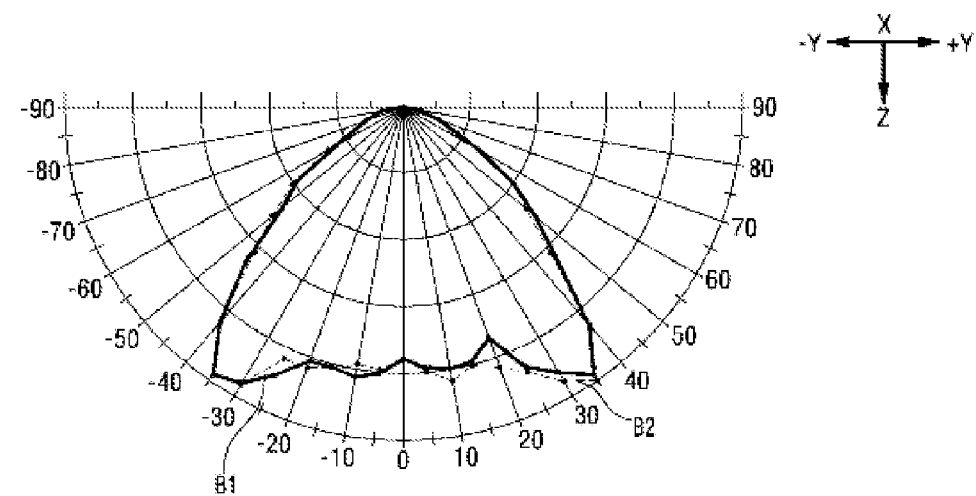
FIG. 34 shows a spatial light distribution chart by the lighting unit 100 including the lens 140B of the second embodiment and a light emitter in which four LEDs are arranged.
Figure 35:
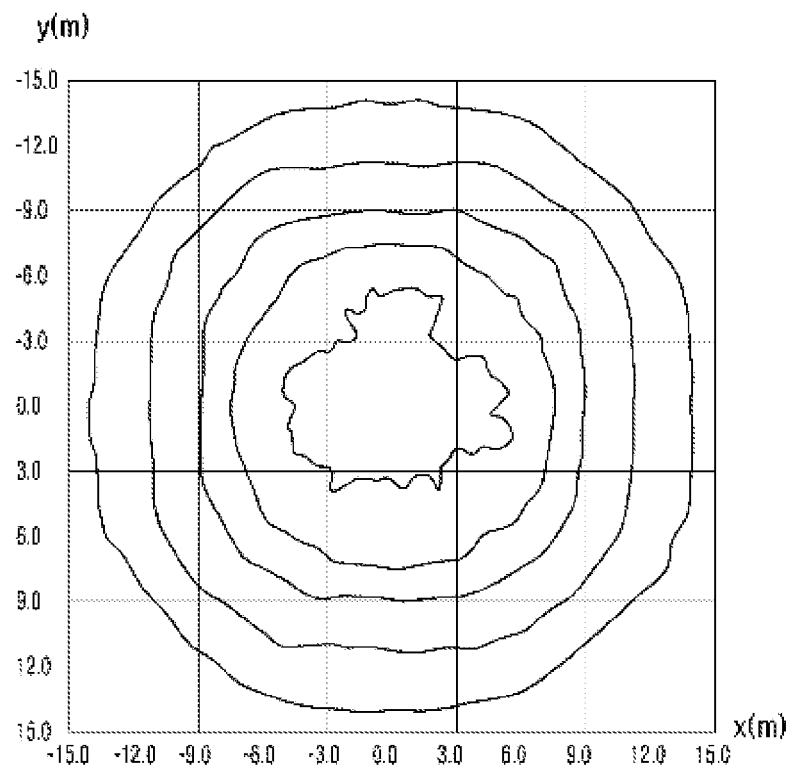
FIG. 35 shows an illuminance distribution chart by the lighting unit 100 including the lens 140B of the second embodiment and a light emitter in which four LEDs are arranged.

FIG. 34 shows a spatial light distribution chart by the lighting unit 100 including the lens 140B of the second embodiment and a light emitter in which four LEDs are arranged. FIG. 35 shows an illuminance distribution chart by the lighting unit 100 including the lens 140B of the second embodiment and a light emitter in which four LEDs are arranged. It can be found that the spatial light distribution of FIG. 34 is much closer to a cone as compared with that of FIG. 15, and two central bands of FIG. 35 are much bigger than those of FIG. 16.

The experimental example 6 relates to the lighting unit 100 including the lens 140B of the second embodiment and the light emitter in which eight LEDs are arranged. Here, Covered is 77%, the FTE (lm/W) is 51, Forward of the FTE (Regular Target) is 1.7, Sideward of the FTE (Regular Target) is 1.7, Backward of the FTE (Regular Target) is 1.6, Forward of the FTE (Uniform Target) is 1.2, Sideward of the FTE (Uniform Target) is 1.2, and Backward of the FTE (Uniform Target) is 1.2.

Figure 36:
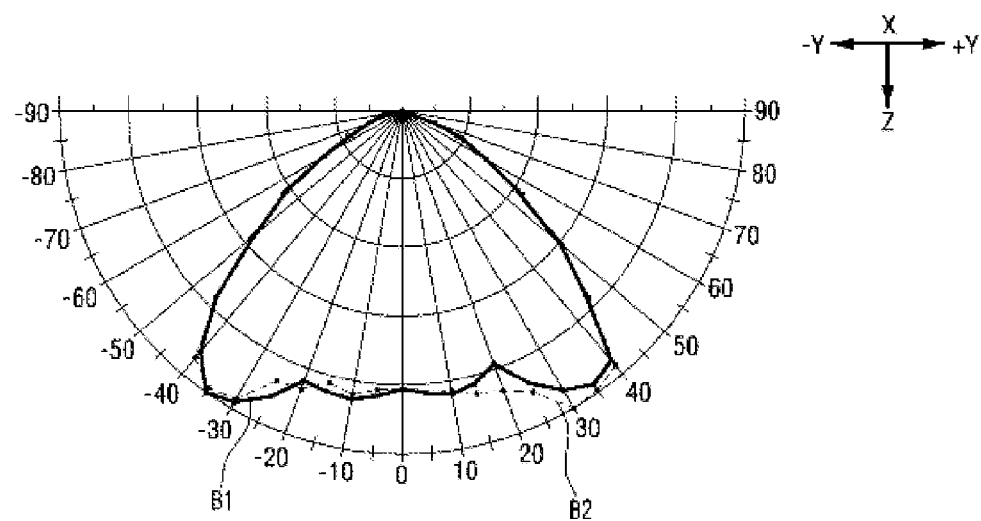
FIG. 36 shows a spatial light distribution chart by the lighting unit 100 including the lens 140B of the second embodiment and a light emitter in which eight LEDs are arranged.
Figure 37:
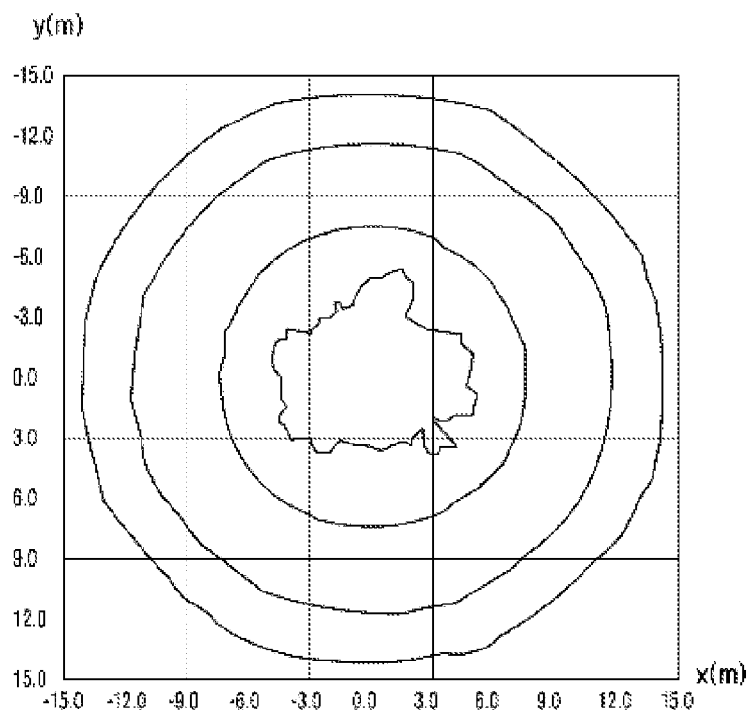
FIG. 37 shows an illuminance distribution chart by the lighting unit 100 including the lens 140B of the second embodiment and a light emitter in which eight LEDs are arranged.

FIG. 36 shows a spatial light distribution chart by the lighting unit 100 including the lens 140B of the second embodiment and a light emitter in which eight LEDs are arranged. FIG. 37 shows an illuminance distribution chart by the lighting unit 100 including the lens 140B of the second embodiment and a light emitter in which eight LEDs are arranged. It can be found that the spatial light distribution of FIG. 36 is much closer to a cone as compared with that of FIG. 15, and two central bands of FIG. 37 are much bigger than those of FIG. 16.

The experimental example 7 relates to the lighting unit 100 including the lens 140B of the second embodiment and the light emitter in which ten LEDs are arranged. Here, Covered is 77%, the FTE (lm/W) is 51, Forward of the FTE (Regular Target) is 1.7, Sideward of the FTE (Regular Target) is 1.8, Backward of the FTE (Regular Target) is 1.7, Forward of the FTE (Uniform Target) is 1.2, Sideward of the FTE (Uniform Target) is 1.3, and Backward of the FTE (Uniform Target) is 1.2.

Figure 38:
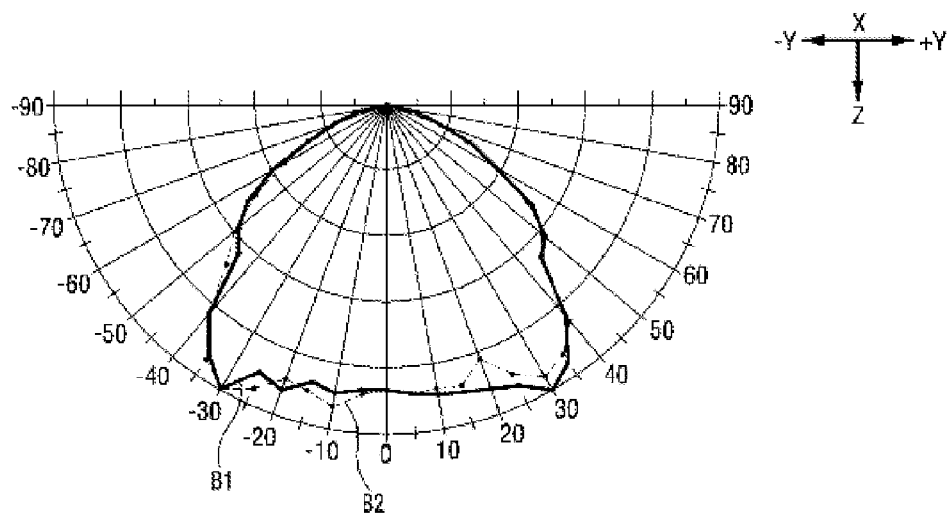
FIG. 38 shows a spatial light distribution chart by the lighting unit 100 including the lens 140B of the second embodiment and a light emitter in which ten LEDs are arranged.
Figure 39:
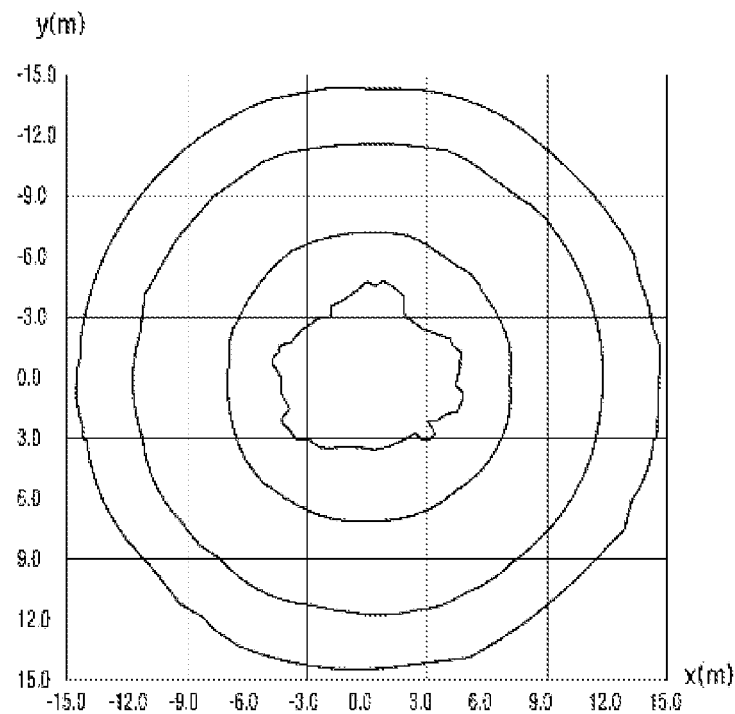
FIG. 39 shows an illuminance distribution chart by the lighting unit 100 including the lens 140B of the second embodiment and a light emitter in which ten LEDs are arranged.

FIG. 38 shows a spatial light distribution chart by the lighting unit 100 including the lens 140B of the second embodiment and a light emitter in which ten LEDs are arranged. FIG. 39 shows an illuminance distribution chart by the lighting unit 100 including the lens 140B of the second embodiment and a light emitter in which ten LEDs are arranged. It can be found that the spatial light distribution of FIG. 38 is much closer to a cone as compared with that of FIG. 15, and two central bands of FIG. 39 are much bigger than those of FIG. 16.

Figure 40:
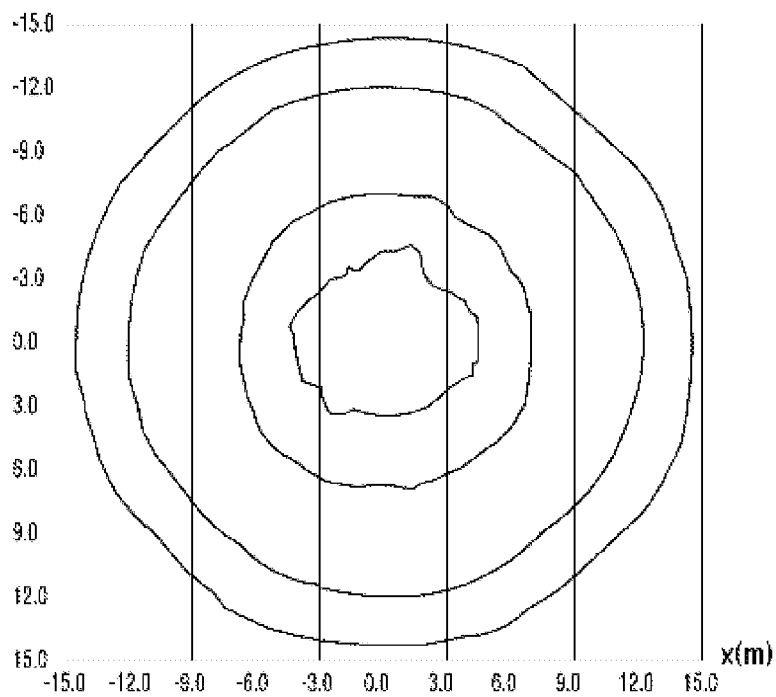
FIG. 40 shows an illuminance distribution chart by the lighting unit 100 including a light emitter in which ten LEDs are arranged and a lens having a Z-axis direction thickness 6 mm less than that of the lens 140B of the second embodiment.

The experimental example 8 relates to the lighting unit 100 including a light emitter in which ten LEDs are arranged and a lens having a Z-axis direction thickness 6 mm less than that of the lens 140B of the second embodiment. Here, Covered is 80%, the FTE (lm/W) is 53, Forward of the FTE (Regular Target) is 1.8, Sideward of the FTE (Regular Target) is 1.8, Backward of the FTE (Regular Target) is 1.8, Forward of the FTE (Uniform Target) is 1.3, Sideward of the FTE (Uniform Target) is 1.3, and Backward of the FTE (Uniform Target) is 1.3. FIG. 40 shows an illuminance distribution chart by the lighting unit 100 including a light emitter in which ten LEDs are arranged and the lens 140B of the second embodiment. It can be found that two central bands of FIG. 40 are much bigger than those of FIG. 16.

The experimental example 9 relates to the lighting unit 100 including the lens 140B of the second embodiment and a light emitter in which twelve LEDs are arranged. Here, Covered is 80%, the FTE (lm/W) is 53, Forward of the FTE (Regular Target) is 1.7, Sideward of the FTE (Regular Target) is 1.7, Backward of the FTE (Regular Target) is 1.7, Forward of the FTE (Uniform Target) is 1.3, Sideward of the FTE (Uniform Target) is 1.2, and Backward of the FTE (Uniform Target) is 1.2.

Figure 41:
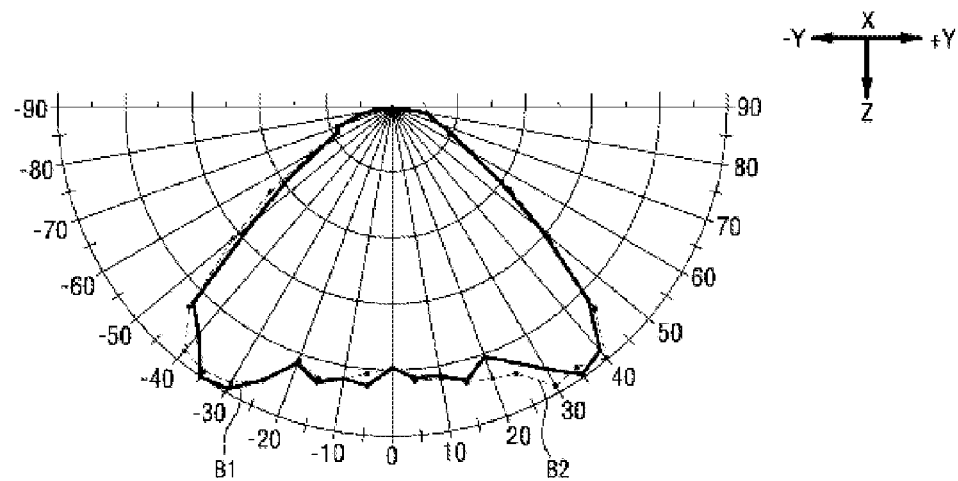
FIG. 41 shows a spatial light distribution chart by the lighting unit 100 including the lens 140B of the second embodiment and a light emitter in which twelve LEDs are arranged.
Figure 42:
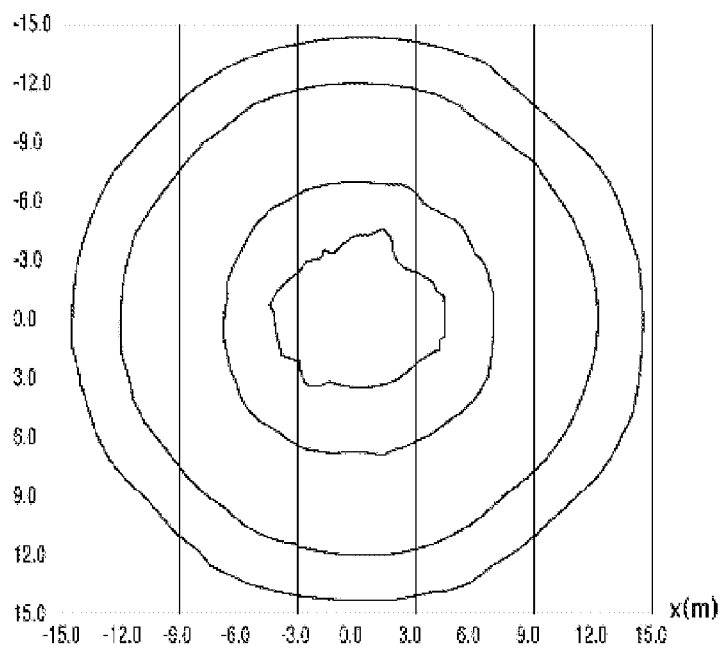
FIG. 42 shows an illuminance distribution chart by the lighting unit 100 including the lens 140B of the second embodiment and a light emitter in which twelve LEDs are arranged.

FIG. 41 shows a spatial light distribution chart by the lighting unit 100 including the lens 140B of the second embodiment and a light emitter in which twelve LEDs are arranged. FIG. 42 shows an illuminance distribution chart by the lighting unit 100 including the lens 140B of the second embodiment and a light emitter in which twelve LEDs are arranged. It can be found that the spatial light distribution of FIG. 41 is much closer to a cone as compared with that of FIG. 15, and two central bands of FIG. 42 are much bigger than those of FIG. 16. Such experimental examples are shown in the following Table 2.

TABLE 2

| | The number of arranged LEDs | Application of Bezier curve | X-axis direction minimum width of 10% area of maximum illuminance (m) | Y-axis direction maximum width of 10% area of maximum illuminance (m) | FTE (Rectangular Target) | | | | FTE (Uniform Rectangle) | | |
|---|---|---|---|---|---|---|---|---|---|---|---|
| | | | | | Forward | Sideward | Backward | Covered (%) | Forward | Sideward | Backward |
| 1 | 4 | X | 15 | 15 | 1.7 | 1.7 | 1.6 | 76 | 1.2 | 1.1 | 1.1 |
| 2 | 8 | X | 15 | 15 | 1.6 | 1.6 | 1.6 | 83 | 1.2 | 1.1 | 1.2 |
| 3 | 10 | X | 15 | 15 | 1.7 | 1.7 | 1.6 | 81 | 1.2 | 1.1 | 1.2 |
| 4 | 12 | X | 15 | 15 | 1.7 | 1.8 | 1.7 | 82 | 1.3 | 1.3 | 1.3 |
| 5 | 4 | O | 15 | 15 | 1.6 | 1.7 | 1.6 | 79 | 1.2 | 1.2 | 1.2 |
| 6 | 8 | O | 15 | 15 | 1.7 | 1.7 | 1.6 | 77 | 1.2 | 1.2 | 1.2 |
| 7 | 10 | O | 15 | 15 | 1.7 | 1.8 | 1.7 | 77 | 1.2 | 1.3 | 1.2 |
| 8 | 10 | O | 15 | 15 | 1.8 | 1.8 | 1.8 | 80 | 1.3 | 1.3 | 1.3 |
| 9 | 12 | O | 15 | 15 | 1.7 | 1.7 | 1.7 | 80 | 1.3 | 1.2 | 1.2 |

Referring to FIGS. 26 to 42, it can be understood that the spatial light distributions and illuminance distributions of the experimental examples 1 to 9 are very similar to each other. Referring to Table 2, depending on the number and arrangement of the LEDs, there is little difference in the illuminance distribution of the irradiation surface on the basis of the FTE Calculator. Moreover, all the experimental examples show that the X-axis direction minimum width of 10% area of maximum illuminance and the Y-axis direction maximum width of 10% area of maximum illuminance are 15 m. Through these data, the lens 140A of the first embodiment and the lens 140B of the second embodiment, even only through their own shapes, show a uniform illuminance distribution, a conical-shaped spatial light distribution and a constant area of the irradiation surface, irrespective of the number and arrangement of the LEDs. The FTE values (lm/W) of the experimental examples show little difference and are between 49 and 54. Therefore, there is a small deviation in FTE values (lm/W). However, since the reference value of the FTE value (lm/W) is 53 in the experimental condition, the experimental examples 2, 4, 5, 8 and 9 are exemplary because they comply with the aforementioned standard. There may be also other experimental examples which are more exemplary than experimental examples 2, 4, 5, 8 and 9. The lens 140 of the present invention can be used for indoor lighting as well as outdoor lighting such as an outdoor lamp and street lamp. In this case, the FTE value (lm/W) is appropriately changed and a lens equivalent to the lens 140 of the present experimental example.

<Variously Modified Examples of Lighting Unit 100>

Figure 43:
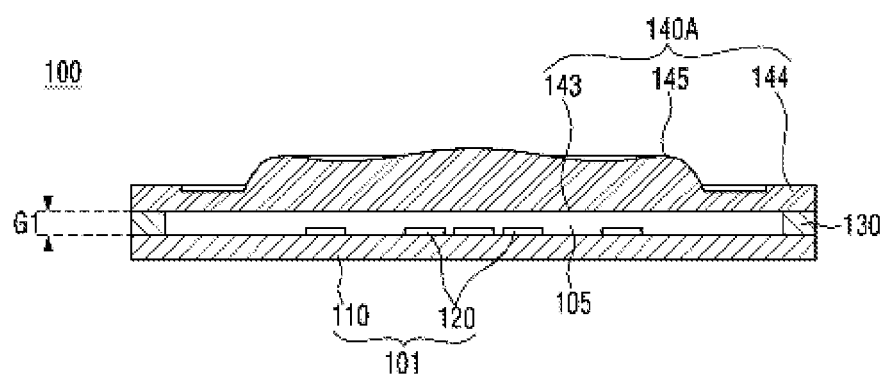
FIG. 43 is a cross-sectional side view of another example of the lighting unit 100 including the lens 140A of the first embodiment.
Figure 44:
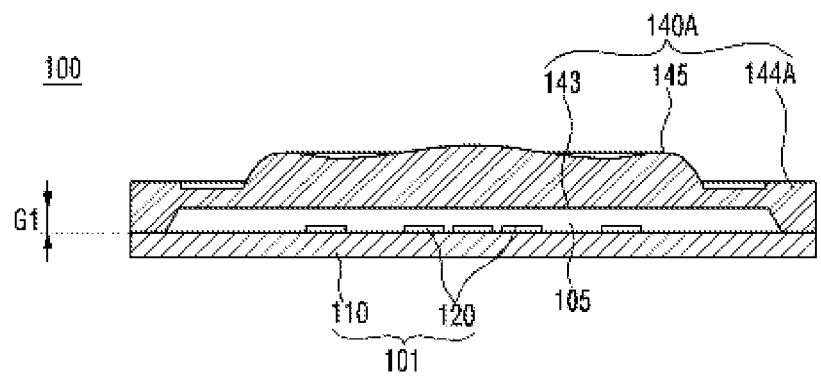
FIG. 44 is a cross-sectional side view of further another example of the lighting unit 100 including the lens 140A of the first embodiment.
Figure 46:
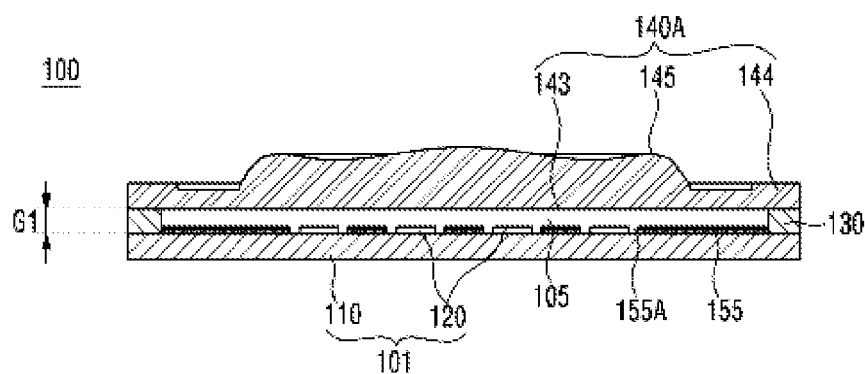
FIG. 46 is a cross-sectional side view of yet another example of the lighting unit 100 including the lens 140A of the first embodiment.

FIGS. 43, 44 and 46 show the lighting unit 100 including the lens 140A of the first embodiment. However, this intends to show a state in which the lens 140 has been coupled to the lighting unit 100 and it can be considered that the lighting unit 100 including the lens 140B of the second embodiment is also described as well. Consequently, the following description means that the lens 140A of the first embodiment and the lens 140B of the second embodiment are the normal lens 140. Therefore, the following description will focus on how the lens 140 is coupled to or is located relative to other members constituting the lighting unit 100, instead of on the shape itself of the lens 140.

FIG. 43 is a cross-sectional side view of another example of the lighting unit 100 including the lens 140A of the first embodiment. The repetitive description of the lighting unit 100 shown in FIGS. 1 and 2 will be omitted.

Referring to FIG. 43, the lighting unit 100 includes the light emitter 101, the lens 140A and the gap member 130. The gap member 130 is made of epoxy material or silicon resin material, and has an annular shape. The gap member 130 contacts with the edge of the top surface of the substrate 110 of the light emitter 101, and contacts with the bottom surface of the flange 144 of the lens 140. Therefore, the gap member 130 is located between the substrate 110 and the lens 140 and leaves a space between the substrate 110 and the lens 140 by a predetermined gap G1. A space 105 formed by the gap member 130 can improve the light direction distribution of the LED 120 of the light emitter 101. Meanwhile, fluorescent material may be added to the gap member 130, if necessary. A reflective material may be coated on the top surface of the substrate 110 of the light emitter 101 in order to reflect light propagating to the substrate 110.

FIG. 44 is a cross-sectional side view of further another example of the lighting unit 100 including the lens 140A of the first embodiment. The repetitive description of the lighting unit 100 shown in FIGS. 1 and 2 will be omitted.

Referring to FIG. 44, in the lighting unit 100, the gap member 130 is substituted by a flange 144A of the lens 140, which projects toward the light emitter 101. The flange 144A of the lens 140 contacts with the edge of the top surface of the substrate 110 of the light emitter 101 or contacts with both the edge of the top surface of the substrate 110 of the light emitter 101 and the outer circumference surface of the substrate 110.

The flange 144 of the lens 140 leaves a space between the lens 140 and the substrate 110 of the light emitter 101 by a predetermined gap G1. A space 105 between the lens 140 and the light emitter 101 may be filled with a resin such as silicon or epoxy. Fluorescent material may be added to the resin. The substrate 110 of the light emitter 101 is placed under the flange 144A of the lens 140 and is stepped with respect to the light incident surface 143. For another example, projections are formed on the outer circumference of the top surface of the substrate 110, so that the lens 140 is spaced from the substrate 110.

Figure 45:
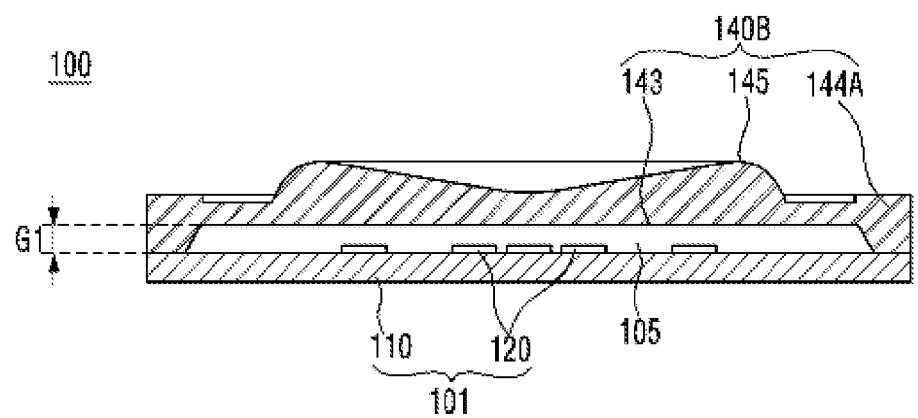
FIG. 45 is a cross-sectional side view of another example of the lighting unit 100 including the lens 140B of the second embodiment.

FIG. 45 shows an embodiment in which the lens 140A of the first embodiment of FIG. 44 is replaced by the lens 140B of the second embodiment. The description thereof will be omitted. In FIG. 43 which has been described and FIG. 46 to be described later, the lens 140B of the second embodiment may take the place of the lens 140A of the first embodiment.

FIG. 46 is a cross-sectional side view of another example of the lighting unit 100 including the lens 140A of the first embodiment. The repetitive description of the lighting unit 100 shown in FIGS. 1 and 2 will be omitted.

Referring to FIG. 46, a reflective plate 155 is placed on the substrate 110 of the light emitter 101 of the lighting unit 100. The reflective plate 155 includes an LED hole 155A so as not to cover the LED 120 and covers areas other than the area in which the LED 120 is exposed. Therefore, a part of light emitted from the LED 120 can be reflected by the reflective plate 155, the amount of the reflected light is increased and luminous efficiency can be improved. The reflective plate 155 should not necessarily be separated from the substrate 110. The substrate 110 having high reflectance can replace the reflective plate 155. Further, a diffusing agent may be applied on the top surface of the reflective plate 155.

The gap member 130 is placed between the substrate 110 and the flange 144 of the lens 140, so that the substrate 110 is spaced from the lens 140 by a predetermined gap G1. A space 105 formed by the gap member 130 can improve the light direction distribution of the LED 120 of the light emitter 101.

Meanwhile, the rest of the configuration is shown in the lighting device 100 of the FIG. 46. There is a lighting device 100 that uses the gap member 130 shown in FIG. 1 or 2 instead of the gap member 130 of FIG. 46. In this case, the same effect as that of the gap member 130 shown in FIG. 1 or 2 is obtained. In other words, it is possible to enhance both the light efficiency and the withstand voltage characteristic. In addition, since the reflective plate 155 used in FIG. 46 is used, the light efficiency can be more improved.

The features, structures and effects and the like described in the embodiments are included in at least one embodiment of the present invention and are not necessarily limited to one embodiment. Furthermore, the features, structures and effects and the like provided in each embodiment can be combined or modified in other embodiments by those skilled in the art to which the embodiments belong. Therefore, the contents related to the combination and modification should be construed to be included in the scope of the present invention.

Although embodiments of the present invention were described above, theses are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A lighting apparatus, comprising:
    a light source including a substrate and at least one light emitting diode (LED) placed on the substrate,
    a lens on the light source and spaced, by a gap, from the substrate of the light source,
    wherein the lens includes a light emitting surface and a bottom surface,
    wherein the light emitting surface comprises a center portion, a middle portion and an edge portion,
    wherein the center portion has a convex shape, the edge portion has a convex shape, and the middle portion is disposed between the center portion and the edge portion and has a predetermined inclination, wherein at least one of a top surface of the center portion and a lateral surface of the edge portion has a curved line, wherein the center portion is overlying a first section of the bottom surface, and the middle portion is overlying a second section of the bottom surface, wherein a thickness of the lens from the first section of the bottom surface to the top surface of the center portion is greater than a thickness of the lens from the second section of the bottom surface to the top surface of the middle portion, wherein a spatial distribution of light emitted from the light emitting surface of the lens has a conical shape, wherein the bottom surface is flat; and a gap defining member disposed between the substrate of the light source and the lens to define said gap, wherein the gap defining member includes a flat portion on an outer circumference thereof, and wherein the gap defining member includes:

an opening in which the at least one LED is disposed, and an electrode-through portion at which the gap defining member has a reduced thickness and which extends from the opening to the flat portion on the outer circumference of the gap defining member.

2. The lighting apparatus of claim 1, wherein the lens has a flange projecting toward the substrate to define said gap.

3. The lighting apparatus of claim 1, wherein the first section of the bottom surface and the second section of the bottom surface are flat.

4. The lighting apparatus of claim 1, wherein the middle portion has a concave shape.

5. A lighting apparatus, comprising:

a light source including a substrate and at least one light emitting diode (LED) placed on the substrate;

a lens on the light source and spaced, by a gap, from the substrate of the light source, wherein the lens includes a light emitting surface and a bottom surface, wherein the light emitting surface comprises a center portion, a middle portion and an edge portion, wherein the center portion has a convex shape, the edge portion has a convex shape, and the middle portion is disposed between the center portion and the edge portion and has a predetermined inclination, wherein at least one of a top surface of the center portion and a lateral surface of the edge portion has a curved line, wherein the center portion is overlying a first section of the bottom surface, and the middle portion is overlying a second section of the bottom surface, wherein a thickness of the lens from the first section of the bottom surface to the top surface of the center portion is greater than a thickness of the lens from the second section of the bottom surface to the top surface of the middle portion, wherein a spatial distribution of light emitted from the light emitting surface of the lens has a conical shape; and a gap defining member disposed between the substrate of the light source and the lens to define said gap, wherein the gap defining member includes a flat portion on an outer circumference thereof, and wherein the substrate includes a flat portion coupled to the flat portion of the gap defining member, and wherein the gap defining member includes:

an opening in which the at least one LED is disposed, and an electrode-through portion at which the gap defining member has a reduced thickness and which extends from the opening to the flat portion on the outer circumference of the gap defining member.

6. The lighting apparatus of claim 5, wherein a diameter of the substrate is equal to or less than a diameter of the gap defining member.

7. The lighting apparatus of claim 5, wherein the lens further comprises a flange placed on a circumference of the light emitting surface.

8. The lighting apparatus of claim 7, the flange comprises a groove on a top surface of the flange.

9. The lighting apparatus of claim 5, wherein an irradiation distribution of light passing through the lens and being irradiated on a virtual irradiation surface has a shape of a circle, wherein a maximum diameter of the circle is 1.6 to 1.8 times as long as a distance from the light source to the irradiation surface, and wherein UP/RT is 0.76 to 0.83.

10. The lighting apparatus of claim 5, wherein a beam angle of the LED is substantially from 120° to 160°, and wherein a spatial distribution of light emitted from the LED has a lambertian shape.

11. The lighting apparatus of claim 5, wherein the middle portion has a concave shape.

12. The lighting apparatus of claim 5, wherein the bottom surface is flat.

13. A lighting apparatus, comprising:

a light source including a substrate and at least one light emitting diode (LED) placed on the substrate;

a lens on the light source and spaced, by a gap, from the substrate of the light source, wherein the lens includes a light emitting surface and a bottom surface, and the bottom surface is flat, wherein the light emitting surface comprises a center portion, a middle portion and an edge portion, wherein the center portion is overlying a first flat section of the bottom surface, and the middle portion is overlying a second flat section of the bottom surface, wherein the center portion has a convex shape, the edge portion has a convex shape, and the middle portion is disposed between the center portion and the edge portion and has a predetermined inclination, wherein at least one of a top surface of the center portion and a lateral surface of the edge portion has a curved line, and wherein a thickness of the lens from the first flat section of the bottom surface to the top surface of the center portion is greater than a thickness of the lens from the second flat section of the bottom surface to the top surface of the middle portion; and a gap defining member disposed between the substrate of the light source and the lens to define said gap, wherein the gap defining member includes a flat portion on an outer circumference thereof, and wherein the gap defining member includes:

an opening in which the at least one LED is disposed, and an electrode-through portion at which the gap defining member has a reduced thickness and which extends from the opening to the flat portion on the outer circumference of the gap defining member.

14. The lighting apparatus of claim 13, wherein the substrate includes a flat portion coupled to the flat portion of the gap defining member.

15. The lighting apparatus of claim 13, wherein the lens has a flange projecting toward the substrate to define said gap.

16. The lighting apparatus of claim 13, wherein the middle portion has a concave shape.

* * * * *